US007738234B2

(12) United States Patent
Oide

(10) Patent No.: US 7,738,234 B2
(45) Date of Patent: Jun. 15, 2010

(54) SOLENOID-OPERATED VALVE AND SOLENOID-OPERATED VALVE-DRIVING CIRCUIT

(75) Inventor: Shigeharu Oide, Adachi-ku (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/391,228

(22) Filed: Mar. 29, 2006

(65) Prior Publication Data

US 2006/0221534 A1 Oct. 5, 2006

(30) Foreign Application Priority Data

Apr. 1, 2005 (JP) ............................. 2005-106197
Mar. 15, 2006 (JP) ............................. 2006-070875

(51) Int. Cl.
*H02H 9/00* (2006.01)

(52) U.S. Cl. ........................ 361/154; 361/160; 361/194

(58) Field of Classification Search ................. 361/154, 361/152, 160, 194
See application file for complete search history.

(56) References Cited

U.S. PATENT DOCUMENTS 4,576,135 A * 3/1986 Johnson ...................... 123/490
5,818,678 A * 10/1998 Berg et al. .................. 361/152
2002/0157650 A1* 10/2002 Gaessler et al. ............. 123/490
2002/0191424 A1 12/2002 Heinke
2005/0254270 A1 11/2005 Melchert et al.

FOREIGN PATENT DOCUMENTS

| | | |
|---|---|---|
| CN | 1125494 | 6/1996 |
| DE | 39 20 064 | 1/1991 |
| DE | 199 63 154 | 6/2001 |
| DE | 102 35 297 | 2/2004 |
| EP | 0 429 573 | 8/1993 |
| JP | 62-049085 | 3/1987 |
| JP | 03-177668 | 8/1991 |
| JP | 05-122990 | 5/1993 |
| JP | 7-331718 | 12/1995 |
| JP | 2000-257744 | 9/2000 |
| KR | 2004-52371 | 6/2004 |
| KR | 2005-28160 | 3/2005 |
| WO | 95/00960 | 1/1995 |

* cited by examiner

*Primary Examiner*—Jared J Fureman
*Assistant Examiner*—Christopher J Clark
(74) *Attorney, Agent, or Firm*—Paul A. Guss

(57) ABSTRACT

When a power source voltage is applied to a switch control section, a control signal is supplied from the switch control section to a transistor. The transistor is placed in an ON state during a period of time corresponding to a pulse width of the control signal. The power source voltage is applied as a first voltage to a solenoid coil. On the other hand, when supply of the control signal to the transistor is stopped, the transistor is placed in an OFF state. A voltage-generating section generates a DC voltage, which is lower than the power source voltage. The transistor applies the generated DC voltage as a second voltage to the solenoid coil.

9 Claims, 18 Drawing Sheets

12B

SWITCH 24 ON
SWITCH 24 OFF

Vo
INPUT VOLTAGE (POWER SOURCE VOLTAGE)
TRANSISTOR ON

TRANSISTOR OFF
BASE TERMINAL INPUT (CONTROL SIGNAL)
T1

VOLTAGE-GENERATING SECTION OUTPUT (SECOND VOLTAGE)
V2

V1 (=Vo)
V2
VOLTAGE APPLIED TO SOLENOID COIL (FIRST VOLTAGE AND SECOND VOLTAGE)

CURRENT THAT FLOWS THROUGH SOLENOID COIL
T0
T2
T3

SWITCH 24 ON
SWITCH 24 OFF

INPUT VOLTAGE (POWER SOURCE VOLTAGE)
Vo

FIRST PULSE SIGNAL
T1

T4
SECOND PULSE SIGNAL
T5

BASE TERMINAL INPUT (FIRST PULSE SIGNAL AND SECOND PULSE SIGNAL)

VOLTAGE APPLIED TO SOLENOID COIL (FIRST VOLTAGE AND SECOND VOLTAGE)
V1 (>Vo)
V2 (>Vo)

CURRENT THAT FLOWS THROUGH SOLENOID COIL
To
T2
T3

SOLENOID-OPERATED VALVE AND SOLENOID-OPERATED VALVE-DRIVING CIRCUIT

BACKGROUND OF THE INVENTION

1. Field of the Invention

The present invention relates to a solenoid-operated valve, which is drivable by applying a first voltage to a solenoid coil, and which is maintained in a driven state by applying a second voltage, and to a solenoid-operated valve-driving circuit, which applies the first voltage or the second voltage to the solenoid coil.

2. Description of the Related Art

A technical concept is known, in which a solenoid-operated valve is arranged at an intermediate position of a flow passage, and wherein when a voltage is applied to a solenoid coil of the solenoid-operated valve from a solenoid-operated valve-driving circuit, the solenoid-operated valve is energized for opening and closing the flow passage (see Japanese Laid-Open Patent Publication Nos. 7-331718 and 2000-257744).

The present applicant has confirmed the use of a solenoid-operated valve 206, based on the use of a solenoid-operated valve-driving circuit 200, 220, as shown in FIGS. 17 and 18.

In the case of the solenoid-operated valve-driving circuit 200 shown in FIG. 17, when a switch 202 is closed, a power source voltage $V_0$ from a DC power source 204 is applied to a solenoid coil 208 of the solenoid-operated valve 206, and the solenoid-operated valve 206 is placed in a driven state, which is brought about by the electromagnetic force resulting from the current that flows through the solenoid coil 208.

In the solenoid-operated valve-driving circuit 200, a resistor 210 and an LED 212, and a diode 214 are electrically connected in parallel respectively to the solenoid coil 208. Therefore, when the LED 212 emits light, the fact that the solenoid-operated valve 206 is in a driven state can be visually recognized. A counter-electromotive force, which is generated in the solenoid coil 208 when application of the power source voltage $V_0$ to the solenoid coil 208 is stopped, is attenuated in a short period of time by the diode 214.

In the case of the solenoid-operated valve-driving circuit 220 shown in FIG. 18, when the switch 202 is closed, a transistor 222 is changed from an OFF state to an ON state, and a power source voltage $V_0$, as a first voltage, is applied to the solenoid coil 208. When a predetermined period of time elapses from closing of the switch 202, and charging of a capacitor 226 is completed by means of a resistor 224, then the transistor 222 is changed from an ON state to an OFF state as a result of the charging voltage of the capacitor 226. Accordingly, the power source voltage $V_0$ is subjected to voltage division by a resistor 228. A second voltage, generated as a result of such a voltage division, is applied to the solenoid coil 208. Thus, the solenoid-operated valve 206 can be maintained in a driven state.

In relation to the solenoid-operated valve-driving circuit 200 shown in FIG. 17, the same power source voltage $V_0$ is applied to the solenoid coil 208 during driving of the solenoid-operated valve 206, as well as during the time region in which the driven state is maintained. Therefore, excessive electric energy is supplied to the solenoid coil 208 during the time region in which the driven state is maintained. As a result, electric power is wastefully consumed.

On the other hand, in relation to the solenoid-operated valve-driving circuit 220 shown in FIG. 18, a power source voltage $V_0$ (first voltage) is applied to the solenoid coil 208 during driving of the solenoid-operated valve 206, whereas a second voltage, which is lower than the power source voltage $V_0$, is applied during the time region in which the solenoid-operated valve 206 is maintained in a driven state. Therefore, it is possible to reduce electric power consumption by the solenoid coil 208, during the time region in which the solenoid-operated valve 206 is maintained in a driven state, as compared with the solenoid-operated valve-driving circuit 200.

However, in the case of the solenoid-operated valve-driving circuit 220, the power source voltage $V_0$ is subjected to voltage division by means of the resistor 228, in order to generate the second voltage, which is then applied to the solenoid coil 208. Therefore, electric power is wastefully consumed in the resistor 228.

Further, in the case of the solenoid-operated valve-driving circuit 220, ON and OFF states of the transistor 222 are switched, on the basis of the charging/discharging time of the capacitor 226 through the resistor 224. Therefore, when the solenoid-operated valve-driving circuit 220 is stopped, for example due to a power failure, then the solenoid-operated valve-driving circuit 220 cannot be restarted in a short period of time, and/or the solenoid-operated valve 206 cannot be changed over quickly into the time region during which the driven state is maintained.

SUMMARY OF THE INVENTION

An object of the present invention is to provide a solenoid-operated valve and a solenoid-operated valve-driving circuit which make it possible to reduce electric power consumption and to realize a quick driving control for a solenoid-operated valve.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
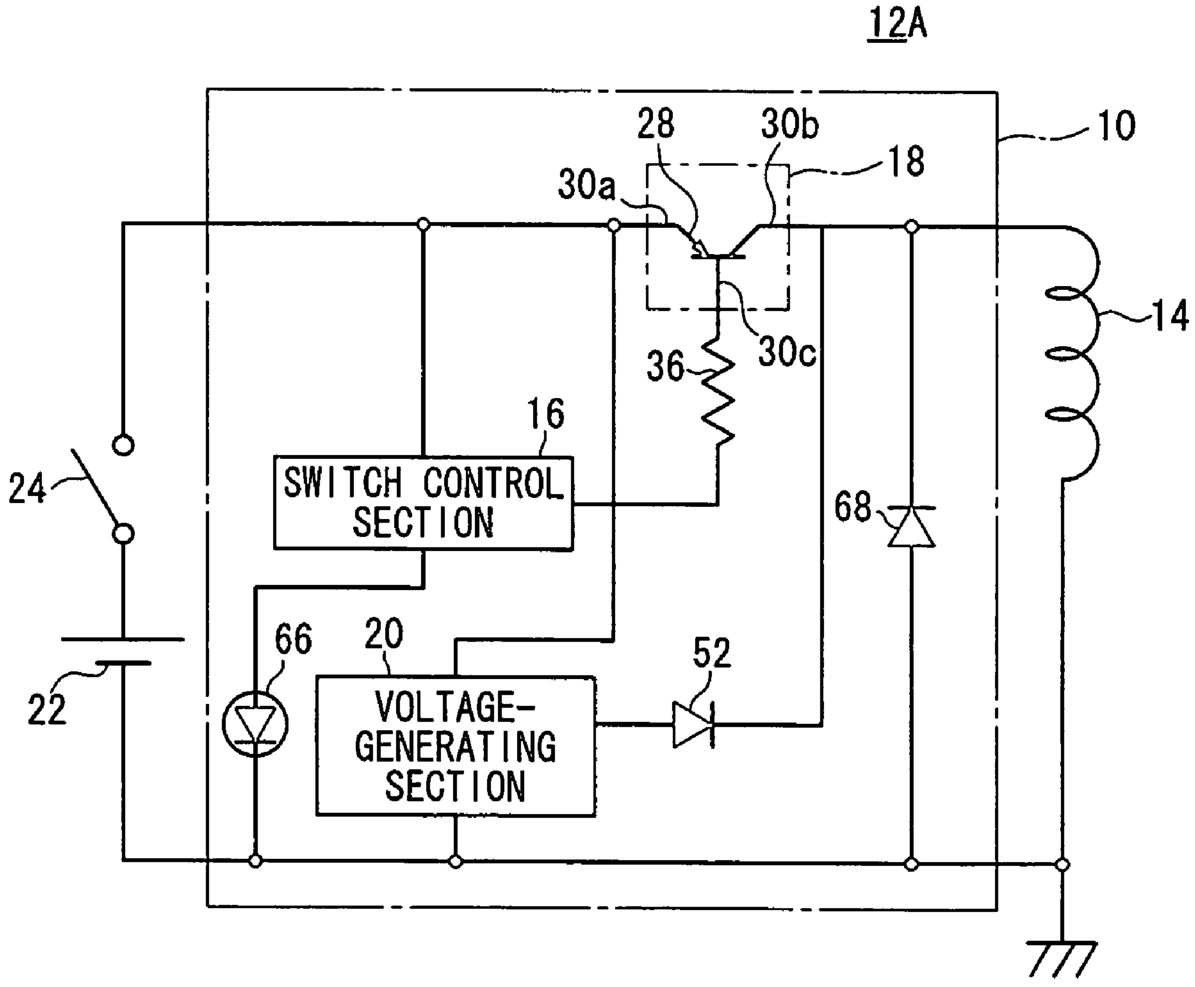
FIG. 1 is a circuit diagram of a solenoid-operated valve according to a first embodiment.
Figure 2:
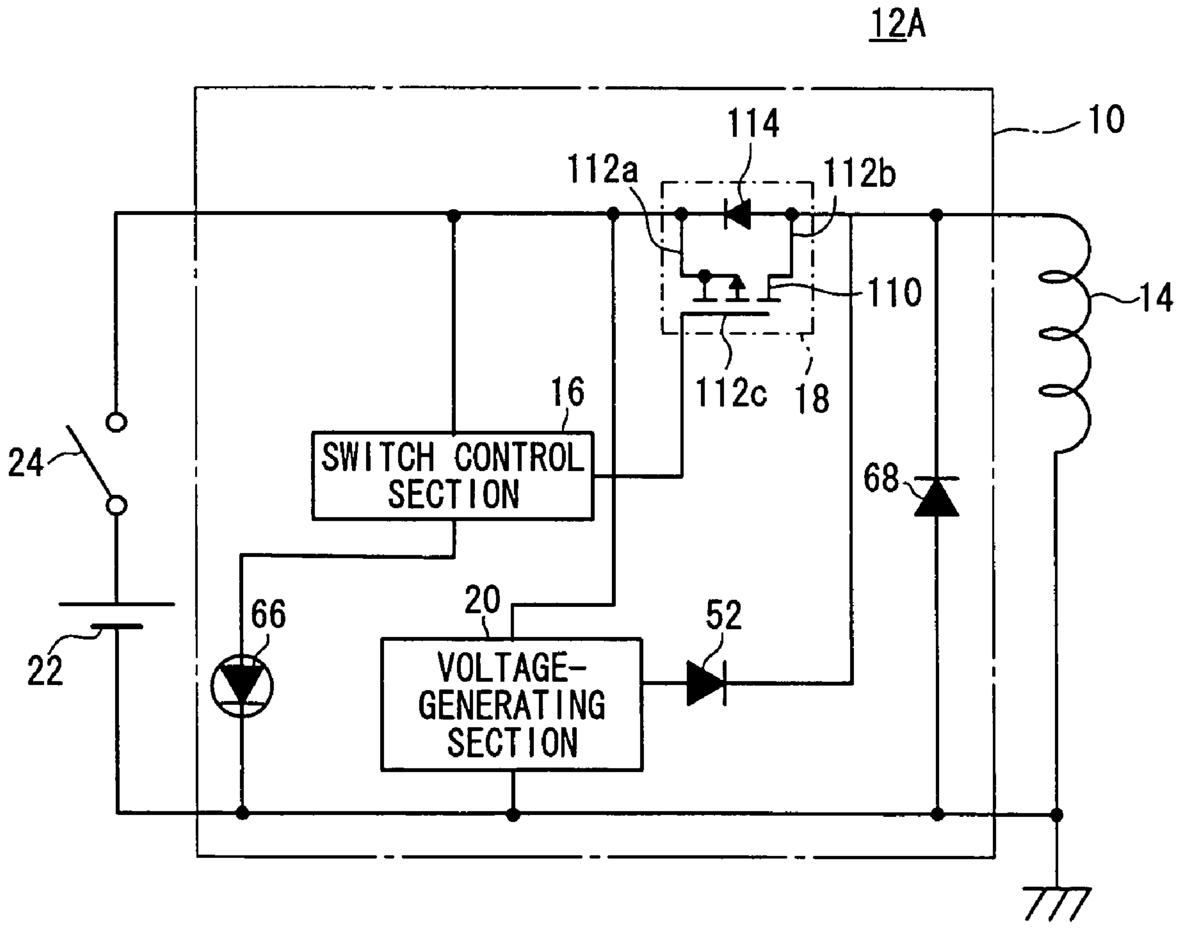
FIG. 2 is a circuit diagram of a solenoid-operated valve in which a switch section in FIG. 1 is comprised of a MOSFET.

FIGS. 1 and 2 show a circuit diagram of a solenoid-operated valve 12A according to a first embodiment, which has a solenoid-operated valve-driving circuit 10. FIGS. 3A to 3E show time charts of a power source voltage $V_0$, a first voltage $V_1$ (first voltage), a second voltage $V_2$ (second voltage), a control signal, and current, in relation to a solenoid coil 14 of the solenoid-operated valve 12A.

As shown in FIG. 1, the solenoid-operated valve 12A comprises the solenoid-operated valve-driving circuit 10, which includes a switch control section 16, a switch section 18, and a voltage-generating section 20. A DC power source 22 is electrically connected via a switch 24 to an emitter terminal (first terminal) 30*a* of a PNP-type transistor 28, which constitutes the switch section 18.

The solenoid-operated valve-driving circuit 10, as well as the solenoid coil 14, is contained in the solenoid-operated valve 12A, or is disposed outside an unillustrated main body of the solenoid-operated valve, which contains the solenoid coil 14.

A collector terminal (second terminal) 30*b* of the transistor 28 is electrically connected to one terminal of the solenoid coil 14. The other terminal of the solenoid coil 14 is electrically connected to a negative pole of the DC power source 22 and grounded.

The switch control section 16 contains an unillustrated single pulse-generating circuit for generating a single pulse signal (control signal) having a pulse width $T_1$ (see FIG. 3B) on the basis of the power source voltage $V_0$. The input terminal thereof is electrically connected to the switch 24, and the output terminal thereof is electrically connected to a base terminal (third terminal) 30*c* via a resistor 36, which serves as a bias resistor for the transistor 28. The input terminal also operates as the power source terminal for the switch control section 16.

Further, a diode 68 is electrically connected in parallel to the solenoid coil 14, and the switch control section 16 is grounded via an LED 66.

In this arrangement, when the switch 24 is closed at time $T_0$ (see FIG. 3E), the control signal, which has a pulse width $T_1$ of a preset predetermined period of time (for example, 100 [ms]), and which has a predetermined pulse voltage, is generated in the switch control section 16. The generated control signal is supplied to the base terminal 30*c* of the transistor 28 via the resistor 36.

Figures 3A, 3B, 3C, 3D, 3E:
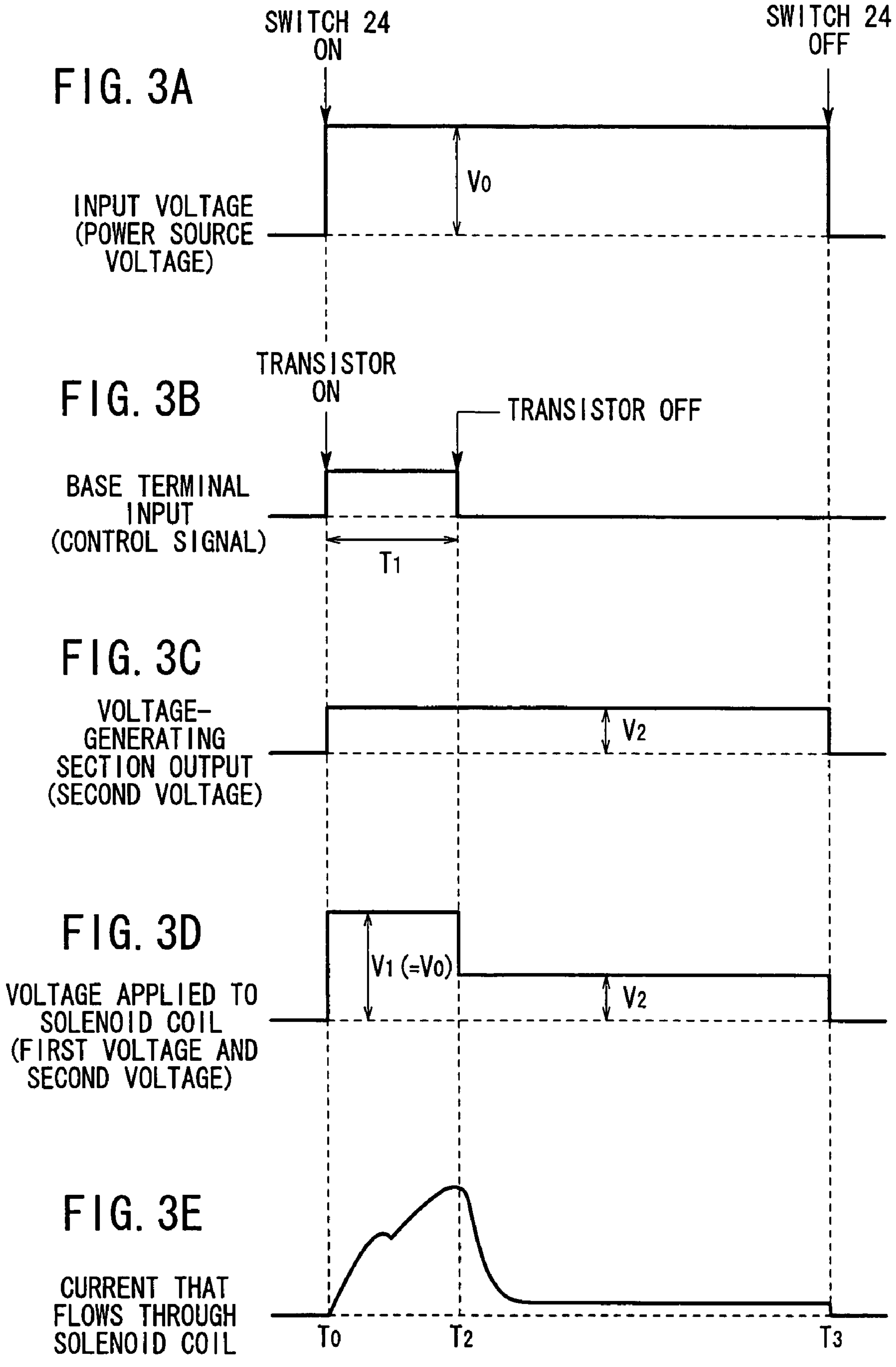
FIG. 3A is a time chart of the power source voltage in the solenoid-operated valve shown in FIG. 1.
FIG. 3B is a time chart of the control signal.
FIG. 3C is a time chart of the second voltage.
FIG. 3D is a time chart of the voltage applied to the solenoid coil.
FIG. 3E is a time chart of current that flows through the solenoid coil.

In the first embodiment, the switch control section 16 supplies the control signal, having a negative polarity with the pulse width $T_1$, to the base terminal 30*c* via the resistor 36. However, as easily appreciated from this explanation of the control signal, FIG. 3B illustrates the control signal, which is inverted to have a positive polarity in conformity with the polarity of the power source voltage $V_0$, the first voltage $V_1$, the second voltage $V_2$, and the current that flows through the solenoid coil 14 (see FIGS. 3A and 3C to 3E).

When the control signal is output, the switch control section 16 (see FIGS. 1 and 2) stops the pulse-generating operation after a predetermined period of time (i.e., after a given time $T_2$).

The voltage-generating section 20 is composed of a switching power source, which lowers the power source voltage $V_0$ of the DC power source 22 to a predetermined voltage, and generates a lowered power source voltage $V_0$ as the second voltage $V_2$. The input terminal thereof is electrically connected to the switch 24, and the output terminal thereof is electrically connected to the solenoid coil 14 via a diode 52.

As described above, the switch section 18 is composed of a PNP-type transistor 28. When the control signal is supplied from the switch control section 16 to the base terminal 30*c* of the transistor 28, an ON state is provided between the emitter terminal 30*a* and the collector terminal 30*b*, during a period of time defined by the pulse width $T_1$ of the control signal. The power source voltage $V_0$ is applied as the first voltage $V_1$ to the solenoid coil 14 of the solenoid-operated valve 12A, during the period of time defined by the pulse width $T_1$. On the other hand, an OFF state is provided between the emitter terminal 30*a* and the collector terminal 30*b*, during a period of time in which supply of the control signal is stopped after time $T_2$. The second voltage $V_2$, which is generated by the voltage-generating section 20, is applied to the solenoid coil 14 of the solenoid-operated valve 12A.

The switch section 18 may comprise an enhancement type p-channel MOSFET 110 shown in FIG. 2, instead of the transistor 28 shown in FIG. 1. In this case, a gate terminal (third terminal) 112*c* of the MOSFET 110 is electrically connected to the switch control section 16, a source terminal (first terminal) 112*a* thereof is electrically connected to the switch 24, and a drain terminal (second terminal) 112*b* is electrically connected to the solenoid coil 14. A diode 114 is electrically connected in parallel, with a forward direction thereof extending from the drain terminal 112*b* to the source terminal 112*a*. The diode 114 protects the MOSFET 110 by permitting current, which flows in a direction from the solenoid coil 14 toward the positive pole of the DC power source 22, to flow through the diode 114. When the switch section 18 is comprised of the MOSFET 110, the resistor 36 shown in FIG. 1 is not required.

The solenoid-operated valve 12A according to the first embodiment is basically constructed as described above. Next, operation of the solenoid-operated valve 12A shall be explained with reference to FIGS. 1 and 3A to 3E.

At first, when the switch 24 is closed at time $T_0$, the power source voltage $V_0$ of the DC power source 22 is applied to the switch control section 16, the emitter terminal 30*a* of the transistor 28, and the voltage-generating section 20. In this situation, the switch control section 16 generates therein a control signal having a pulse width $T_1$ defined by a predetermined period of time, and which has a predetermined pulse voltage. The generated control signal is supplied via the resistor 36 to the base terminal 30*c* of the transistor 28.

The switch control section 16 initiates output of the control signal at time $T_0$. Output of the control signal is stopped after a time $T_2$, which is later than the time $T_0$ by the pulse width $T_1$. That is, the switch control section 16 supplies one pulse as the control signal to the base terminal 30*c* of the transistor 28.

When the control signal is supplied to the base terminal 30*c* of the transistor 28, an ON state is provided between the emitter terminal 30*a* and the collector terminal 30*b* of the transistor 28 during the pulse generation time of the control signal (i.e., for a period of time from time $T_0$ to time $T_2$). The transistor 28 applies the power source voltage $V_0$ as the first voltage $V_1$ to the solenoid coil 14.

Accordingly, the current that flows through the solenoid coil 14 is suddenly increased as time elapses within the time region (i.e., time region from time $T_0$ to time $T_2$) in which the first voltage $V_1$ is applied to the solenoid coil 14. The electromagnetic force caused by the current energizes the solenoid-operated valve 12A quickly.

In this situation, the current, which is suddenly increased as described above, decreases slightly during the time region in which the first voltage $V_1$ is applied (see FIG. 3E). This phenomenon results from the fact that a movable core, which is connected to an unillustrated valve plug of the solenoid-operated valve 12A, is attracted to a fixed core by means of the electromagnetic force.

The voltage-generating section 20 is subjected to a short circuit formation by the transistor 28 during the time region in which the transistor 28 is placed in an ON state. Therefore, no voltage is applied to the solenoid coil 14 from the voltage-generating section 20.

Subsequently, when the pulse output operation of the control signal from the switch control section 16 is stopped at time $T_2$, the state between the emitter terminal 30*a* and the collector terminal 30*b* of the transistor 28 is changed from an ON state to an OFF state.

Accordingly, the voltage-generating section 20 lowers the power source voltage $V_0$ to a preset predetermined voltage. The predetermined voltage (DC voltage), which is decreased in voltage as described above, is applied as a second voltage $V_2$, which is lower than the first voltage $V_1$, to the solenoid coil 14 via the diode 52.

As a result, a current, which is smaller than the current used during driving of the solenoid-operated valve 12A, flows through the solenoid coil 14 during a time region after the time $T_2$. Thus, the solenoid coil 14 can maintain the driven state of the solenoid-operated valve 12A using a smaller current.

When the switch 24 is opened at time $T_3$, application of the power source voltage $V_0$ to the switch control section 16, the emitter terminal 30*a* of the transistor 28, and the voltage-generating section 20, is stopped. As a result, application of the second voltage $V_2$ to the solenoid coil 14 is also stopped. When the application of the second voltage $V_2$ to the solenoid coil 14 is stopped, a counter-electromotive force is generated in the solenoid coil 14. However, current resulting from the counter-electromotive force flows through the diode 68, and thus the counter-electromotive force is quickly attenuated.

While the first voltage $V_1$ or the second voltage $V_2$ being applied to the solenoid coil 14, the LED 66 emits light in accordance with current that flows through the switch control section 16 and the LED 66. Therefore, when light emission from the LED 66 is visually recognized, it is possible to confirm that the first voltage $V_1$ or the second voltage $V_2$ has been applied to the solenoid coil 14, and that the solenoid-operated valve 12A is in a driven state.

Figure 4:
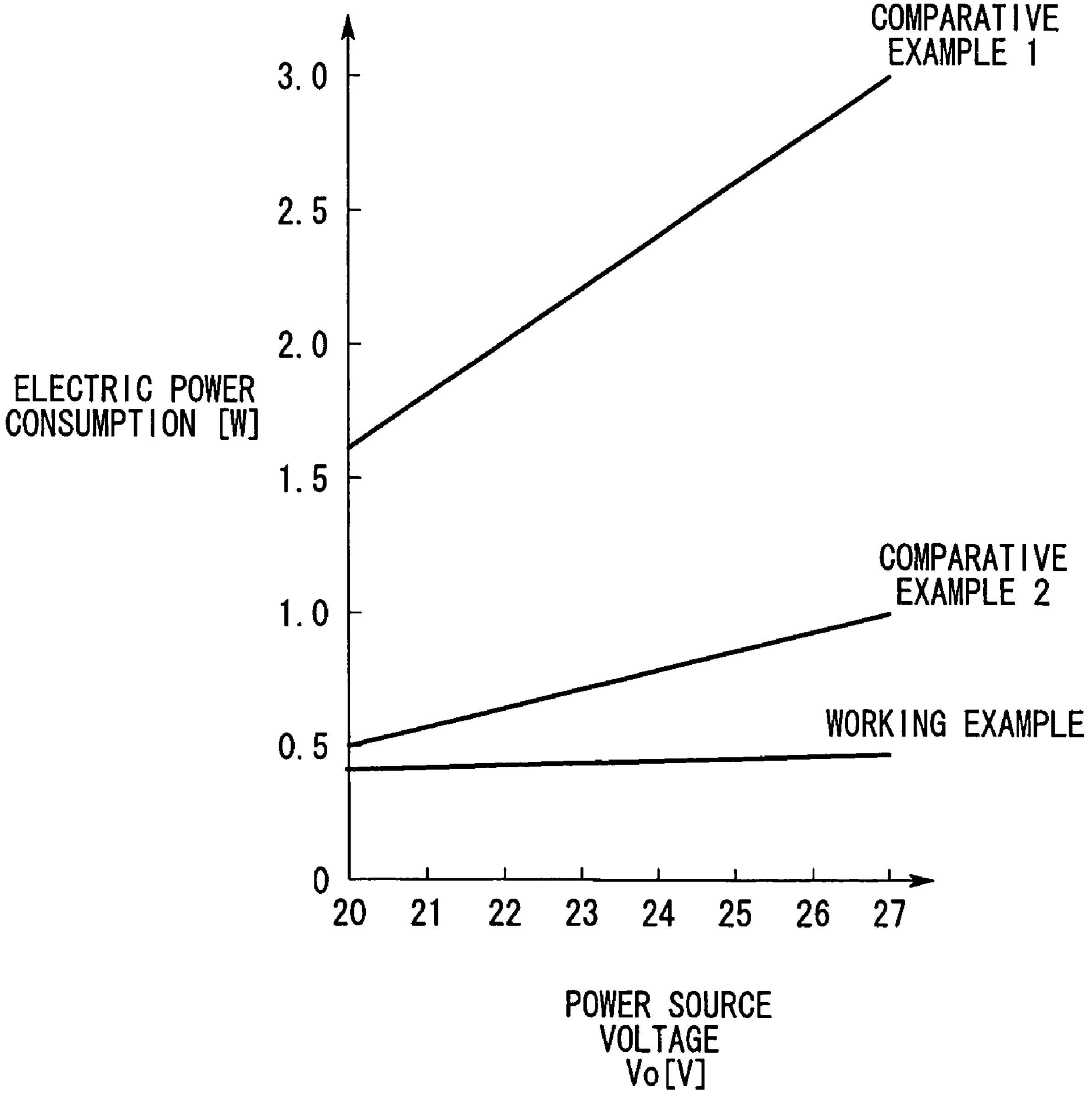
FIG. 4 is characteristics in which electric power consumption of the solenoid-operated valve-driving circuit and the solenoid coil shown in FIG. 1 is compared with electric power consumed by solenoid-operated valve-driving circuits and solenoid coils according to Comparative Examples.
Figure 17:
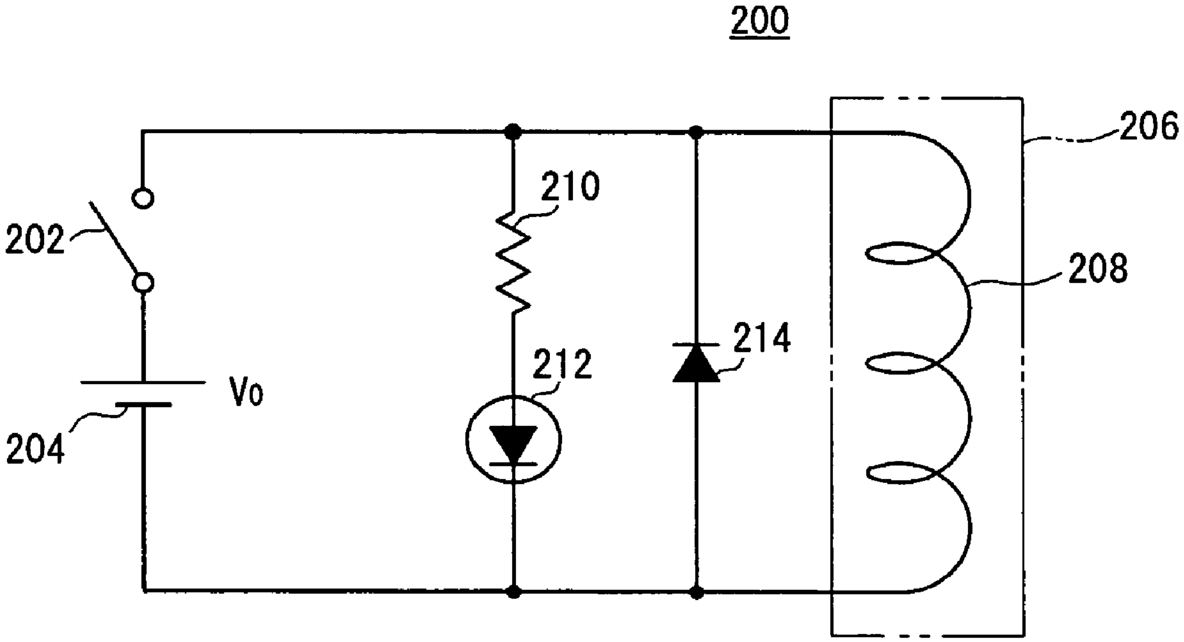
PRIOR ART FIG. 17
FIG. 17 is a circuit diagram of an exemplary solenoid-operated valve devised by the present applicant.
Figure 18:
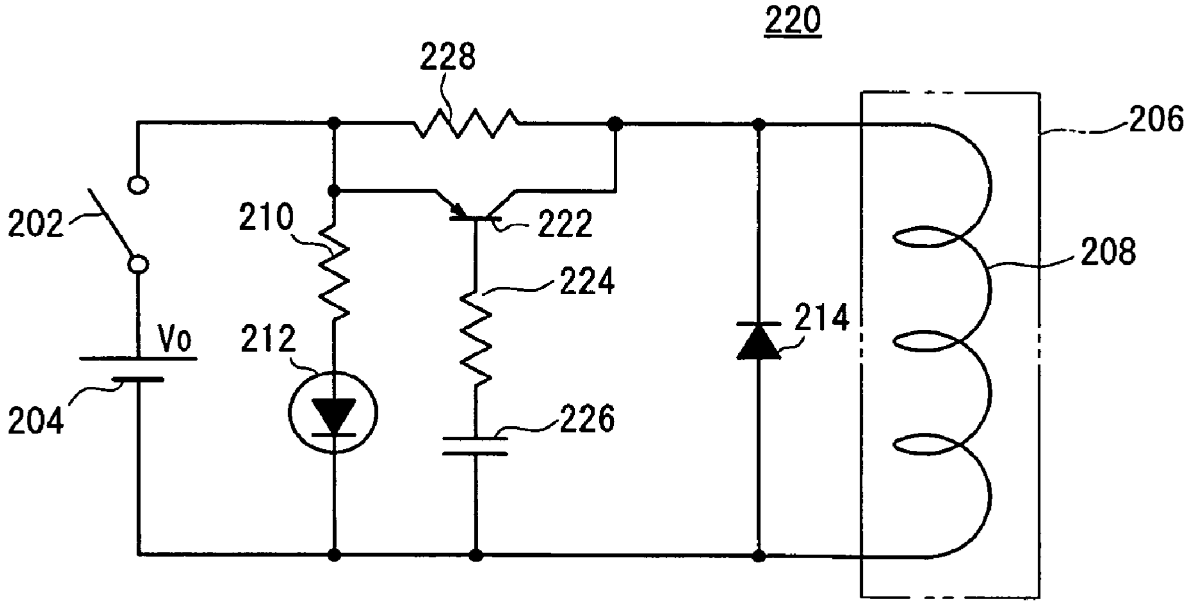
PRIOR ART FIG. 18
FIG. 18 is a circuit diagram of another exemplary solenoid-operated valve devised by the present applicant.

FIG. 4 shows a graph which compares the electric power consumption of the solenoid-operated valve-driving circuit 10 and the solenoid coil 14 (Working Example, see FIG. 1), with the electric power consumption of the solenoid-operated valve-driving circuit 200 and the solenoid coil 208 (Comparative Example 1, see FIG. 17), and the electric power consumption of the solenoid-operated valve-driving circuit 220 and the solenoid coil 208 (Comparative Example 2, see FIG. 18).

For example, when the power source voltage $V_0$ is 24 [V], the electric power consumption of Comparative Example 1 is 2.4 [W], and the electric power consumption of Comparative Example 2 is 0.8 [W]. However, the electric power consumption of the Working Example is 0.4 [W]. That is, due to reasons described below, the Working Example provides an 84[%] decrease in electric power consumption, as compared with the electric power consumption of Comparative Example 1, and further, the Working Example provides a 50[%] decrease in electric power consumption, as compared with the electric power consumption of Comparative Example 2.

That is, in the case of the solenoid-operated valve-driving circuit 200 and the solenoid coil 208 (see FIG. 17), the power source voltage $V_0$ is applied to the solenoid coil 208 without any break during driving of the solenoid-operated valve 206 and the time region during which the driven state is maintained. Therefore, the electric power consumption of the solenoid coil 208 increases conspicuously.

In the case of the solenoid-operated valve-driving circuit 220 and the solenoid coil 208 (see FIG. 18), the power source voltage $V_0$ is applied to the solenoid coil 208 during driving of the solenoid-operated valve 206. A second voltage, which is lower than the power source voltage $V_0$, is applied to the solenoid coil 208 as a result of voltage division by the resistor 228, during a time region in which the driven state of the solenoid-operated valve 206 is maintained. Therefore, electric power consumption is reduced as compared with the solenoid-operated valve-driving circuit 200 (see FIG. 17). However, electric power is consumed by the resistor 228 as a result of performing voltage division of the power source voltage $V_0$ in the resistor 228. Therefore, the electric power consumption required therefor increases the electric power consumption of the solenoid-operated valve-driving circuit 220.

By contrast, in the case of the solenoid-operated valve 12A (see FIG. 1), the first voltage $V_1$ is applied to the solenoid coil 14 in order to quickly drive the solenoid-operated valve 12A during initial driving of the solenoid-operated valve 12A (i.e., during the period of time from time $T_0$ to time $T_2$, as shown in FIGS. 3A to 3E). The second voltage $V_2$ is applied to the solenoid coil 14 during the time region (i.e., during the period of time from time $T_2$ to time $T_3$) in which the driven state of the solenoid-operated valve 12A is maintained. As a result, the driven state of the solenoid-operated valve 12A is maintained using an electric energy amount which is smaller than that used during initial driving of the solenoid-operated valve 12A, during a time region in which the driven state of the solenoid-operated valve 12A is maintained. Therefore, the solenoid-operated valve 12A can reduce electric power consumption of the solenoid coil 14, as compared with the solenoid-operated valves 206 shown in FIGS. 17 and 18.

In the case of the solenoid-operated valve 12A, a resistor is not arranged within the supply line for the power source voltage $V_0$, the first voltage $V_1$, and the second voltage $V_2$. Accordingly, even when voltage is applied to the solenoid coil 14 of the solenoid-operated valve 12A, electric power is not consumed in relation to the supply line. Therefore, the solenoid-operated valve 12A can reduce electric power consumption in the solenoid-operated valve 12A, as compared with the solenoid-operated valve 206 shown in FIG. 18.

As described above, in the solenoid-operated valve 12A according to the first embodiment, the control signal is supplied from the switch control section 16 to the switch section 18. The switch section 18 performs a time-based control of the electric connection state between the DC power source or the voltage-generating section 20 and the solenoid coil 14.

That is, when the control signal is supplied to the switch section 18, and an ON state is provided, the power source voltage $V_0$ is applied as a first voltage $V_1$ to the solenoid coil 14. As a result, a large electric energy is supplied to the solenoid coil 14, whereby the solenoid-operated valve 12A can initially be driven in a short period of time.

On the other hand, when supply of the control signal to the switch section 18 is stopped, the state is changed to the OFF state. A second voltage $V_2$, which is lower than the first voltage $V_1$, is applied to the solenoid coil 14. As a result, the electric energy supplied to the solenoid coil 14 is decreased. The driven state of the solenoid-operated valve 12A can be maintained using a smaller amount of electric energy.

The switch control section 16 performs a time-based control of the ON and OFF states of the switch section 18, as described above. Accordingly, the electric energy amount supplied from the DC power source 22 or the voltage-generating section 20 to the solenoid coil 14, as well as the supply times for the first voltage $V_1$ and the second voltage $V_2$, can be easily adjusted.

In this embodiment, the supply time and the supply stop time of the control signal for the switch section 18 represent periods of time during which the first voltage $V_1$ and the second voltage $V_2$ are applied to the solenoid coil 14. Therefore, when the supply time is adjusted to conform to specifications of the solenoid-operated valve 12A, desired values for the start-up time of the solenoid-operated valve 12A, the current that flows through the solenoid coil 14, and the electric energy supplied to the solenoid coil 14, can be obtained. As a result, the solenoid-operated valve 12A reduces electric power consumption of the solenoid coil 14 and enhances versatility of the solenoid-operated valve 12A, as compared with the solenoid-operated valve-driving circuits 200, 220 (see FIGS. 17 and 18).

When the supply time of the control signal from the switch control section 16 to the switch section 18 is appropriately adjusted, the time of the ON state of the switch section 18 can be changed. Therefore, if the solenoid-operated valve 12A is placed in a stopped state due to a power failure or the like, the solenoid-operated valve 12A can be restarted in a shorter period of time, and the solenoid-operated valve 12A can be more quickly changed over into a time region in which the driven state is maintained, as compared with the solenoid-operated valve-driving circuit 220 based on use of the charging/discharging time of the capacitor 226 and the resistor 224.

In the solenoid-operated valve 12A, a resistor is not used in the supply line of the power source voltage $V_0$, the first voltage $V_1$, and the second voltage $V_2$. Therefore, overall electric power consumption of the apparatus can be reduced, as compared with the solenoid-operated valve-driving circuit 220. Further, it is unnecessary to provide countermeasures against heat. Thus, overall durability of the apparatus can be improved, and production costs of the apparatus can be reduced.

The switch control section 16 generates the control signal by utilizing the power source voltage $V_0$. Therefore, it is unnecessary to provide an exclusive power source, which otherwise would be required to generate the control signal. Thus, it is possible to realize miniaturization of the solenoid-operated valve 12A. The period of time of the ON state of the switch section 18 is determined by the pulse width $T_1$ of the control signal. Therefore, the solenoid-operated valve 12A can be driven and controlled with ease.

The switch section 18, composed of the transistor 28 or the MOSFET 110, enables the response performance of the first voltage $V_1$ and the second voltage $V_2$ to be improved with respect to the control signal. Therefore, the response performance of the solenoid coil 14 and the solenoid-operated valve 12A, to which the first voltage $V_1$ and the second voltage $V_2$ are applied, can be improved. In particular, it is possible to reduce impedance of the semiconductor element making up the switch section 18, by composing the switch section 18 of the MOSFET 110.

Figure 5A:
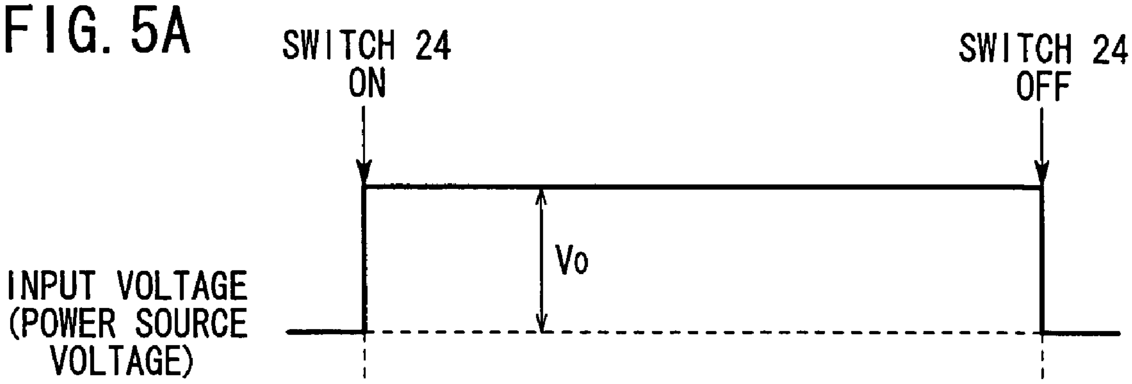
FIG. 5A is a time chart of the power source voltage in the solenoid-operated valve shown in FIG. 1.
Figure 5B:
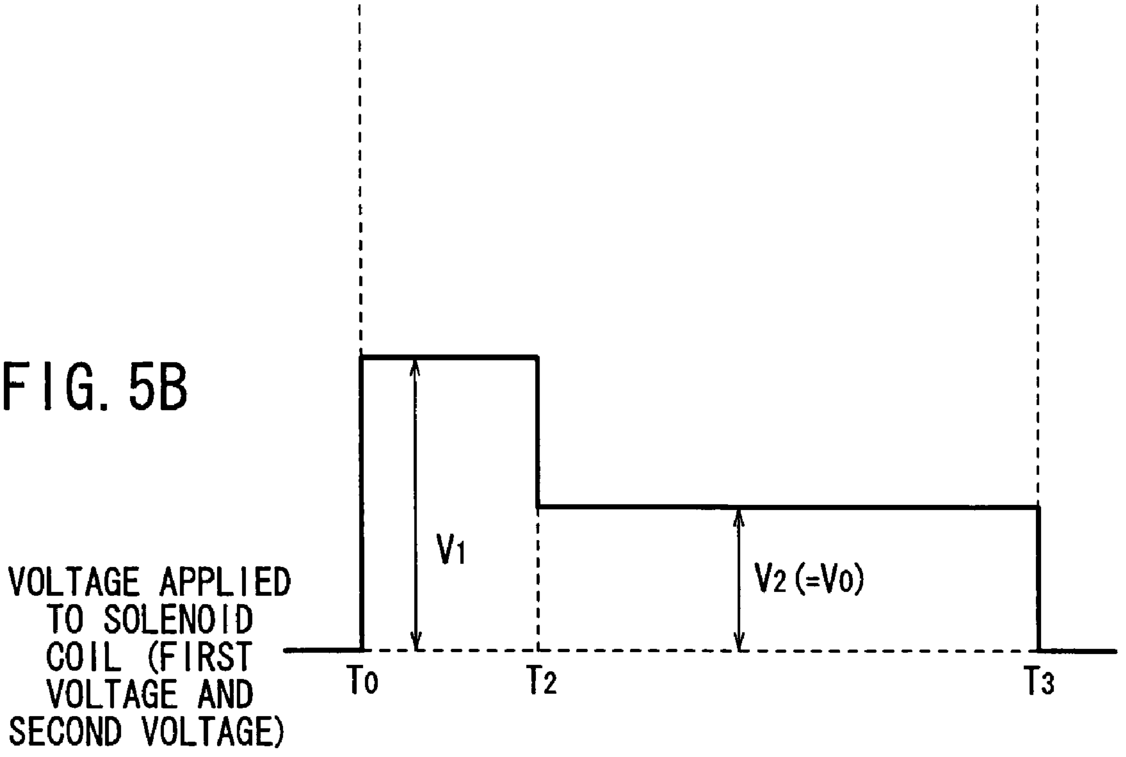
FIG. 5B is a time chart of the voltage applied to the solenoid coil.
Figure 6A:
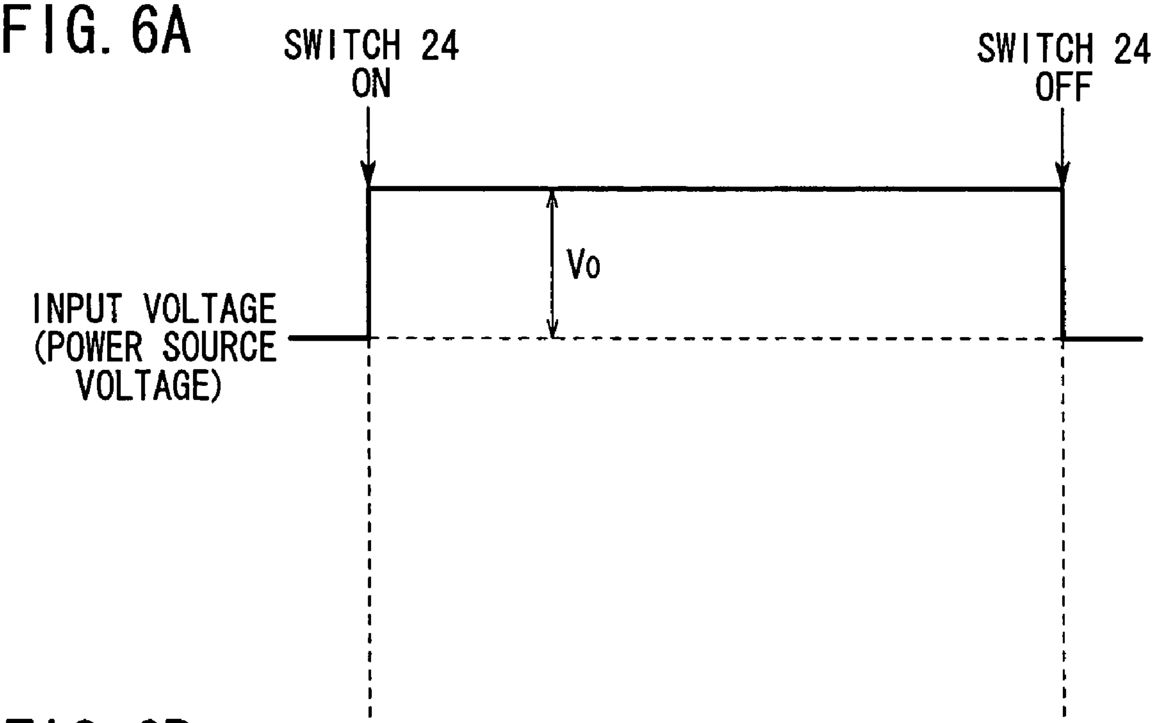
FIG. 6A is a time chart of the power source voltage in the solenoid-operated valve shown in FIG. 1.
Figure 6B:
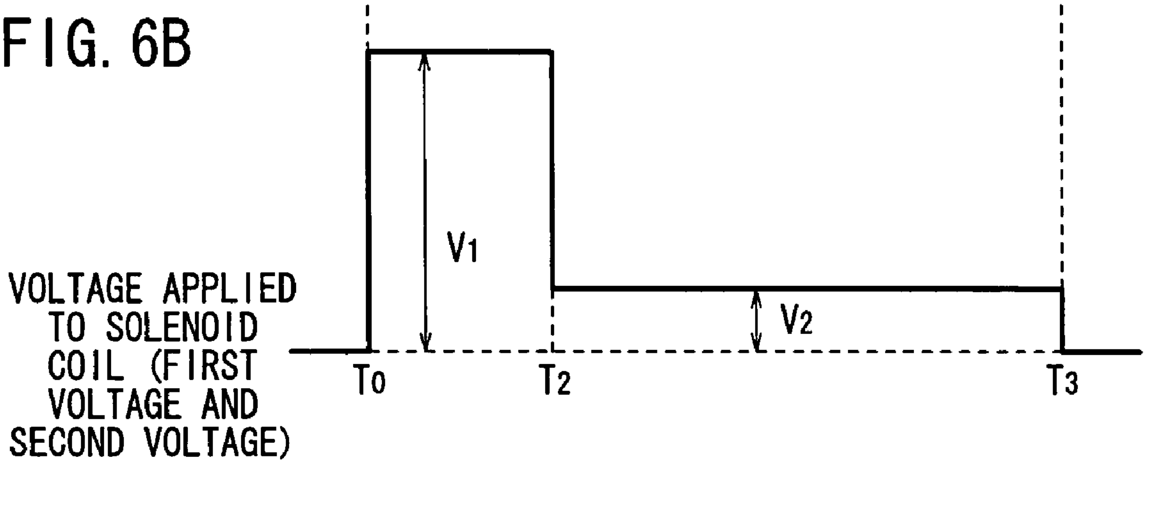
FIG. 6B is a time chart of the voltage applied to the solenoid coil.

In the solenoid-operated valve 12A described above, the first voltage $V_1$ is approximately the same as the power source voltage $V_0$, and the second voltage $V_2$ is lower than the power source voltage $V_0$. However, as shown in FIGS. 5A and 5B, it is also allowable for the first voltage $V_1$ to be higher than the power source voltage $V_0$, and the second voltage $V_2$ to be approximately the same as the power source voltage $V_0$. Further, as shown in FIGS. 6A and 6B, it is also allowable for the first voltage $V_1$ to be higher than the power source voltage $V_0$, and the second voltage $V_2$ to be lower than the power source voltage $V_0$. It is a matter of course that the functions and effects can be obtained, as described above, when the first voltage $V_1$ and the second voltage $V_2$ shown in FIGS. 5B and 6B are applied to the solenoid coil 14.

Next, an explanation shall be made, with reference to FIGS. 7 and 8A to 8F, concerning a solenoid-operated valve 12B according to a second embodiment. The constitutive components, which are the same as those respective constitutive components of the solenoid-operated valve 12A according to the first embodiment shown in FIGS. 1 to 6B, are designated by the same reference numerals, and detailed explanation of such components shall be omitted. The following subject matter shall be described in the same manner as that described above.

The solenoid-operated valve 12B according to the second embodiment is different from the solenoid-operated valve 12A according to the first embodiment (see FIGS. 1 to 6B) in that the voltage-generating section 20 is not provided.

Figure 7:
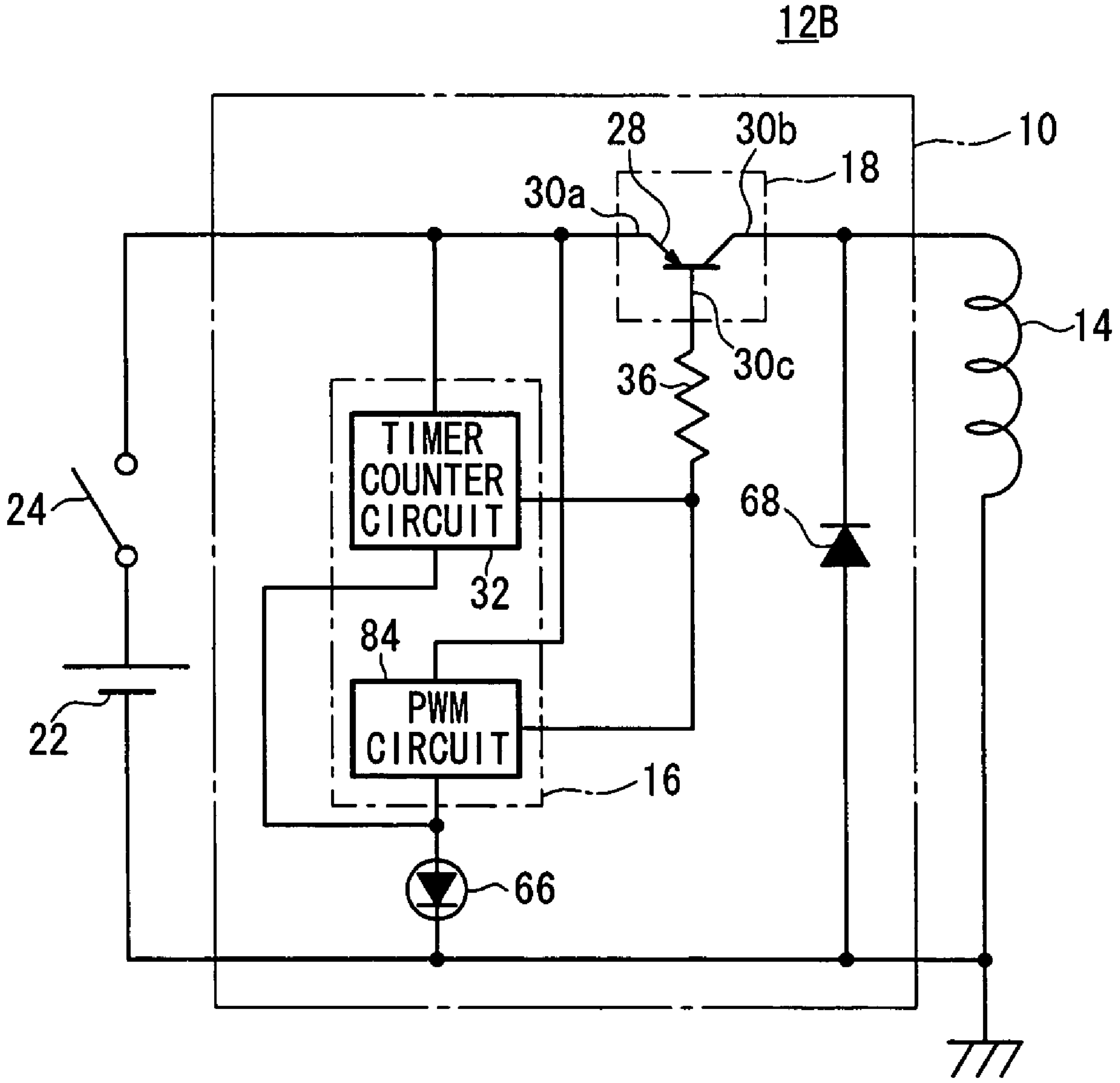
FIG. 7 is a circuit diagram of a solenoid-operated valve according to a second embodiment.

More specifically, as shown in FIG. 7, in the case of the solenoid-operated valve 12B, the switch control section 16 is composed of a timer counter circuit (single pulse-generating circuit) 32 and a PWM circuit (repetitive pulse-generating circuit) 84.

In the switch control section 16, the input terminal of the timer counter circuit 32 is electrically connected to the switch 24. On the other hand, the output terminal thereof is electrically connected to the base terminal 30*c* of the transistor 28 via the resistor 36.

The input terminal of the PWM circuit 84 is electrically connected to the switch 24. On the other hand, the output terminal is electrically connected to the base terminal 30*c* of the transistor 28 via the resistor 36.

Further, the timer counter circuit 32 and the PWM circuit 84 is grounded via the LED 66.

In this arrangement, when the switch 24 is closed at time $T_0$ (see FIG. 8F), the power source voltage $V_0$ (see FIG. 8A) is applied to the input terminal of the timer counter circuit 32, in order to generate a first pulse signal, which has a pulse width $T_1$ (see FIG. 8B) of a predetermined period of time (for example, 100 [ms]), previously set in the timer counter circuit 32, and which has a predetermined pulse voltage. The generated first pulse signal is supplied via the resistor 36 to the base terminal 30*c* of the transistor 28.

In the second embodiment, the switch control section 16 supplies the first pulse signal, having a negative polarity with a pulse width of $T_1$, and the second pulse signal, having a negative polarity with a pulse width $T_4$ (see FIG. 8C), via the resistor 36 to the base terminal 30*c*. However, as easily understood from the explanation of the first pulse signal, the second pulse signal, and the input of the base terminal 30*c* (first pulse signal and second pulse signal), the first pulse signal, the second pulse signal, and the input, as shown in FIGS. 8B to 8D, are illustrated as being inverted with a positive polarity in conformity with the polarity of the power source voltage $V_0$, the first voltage $V_1$, the second voltage $V_2$, and the current (see FIGS. 8A, 8E, and 8F) that flows through the solenoid coil 14, in the same manner as in FIG. 3B.

Figures 8A, 8B, 8C, 8D, 8E, 8F:
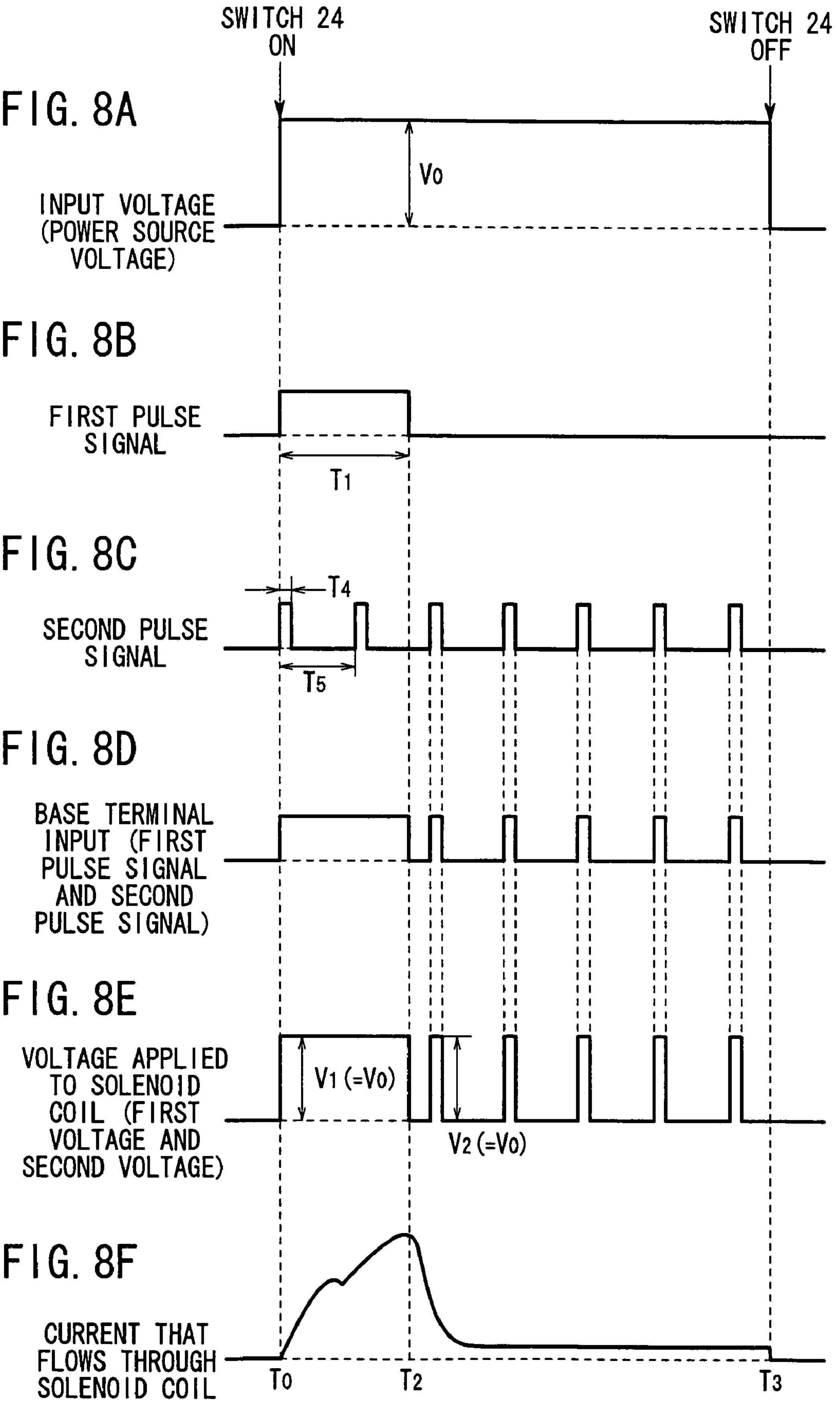
FIG. 8A is a time chart of the power source voltage in the solenoid-operated valve shown in FIG. 7.
FIG. 8B is a time chart of a first pulse signal.
FIG. 8C is a time chart of a second pulse signal.
FIG. 8D is a time chart of a base terminal input.
FIG. 8E is a time chart of the voltage applied to the solenoid coil.
FIG. 8F is a time chart of the current that flows through the solenoid coil.
Figure 9:
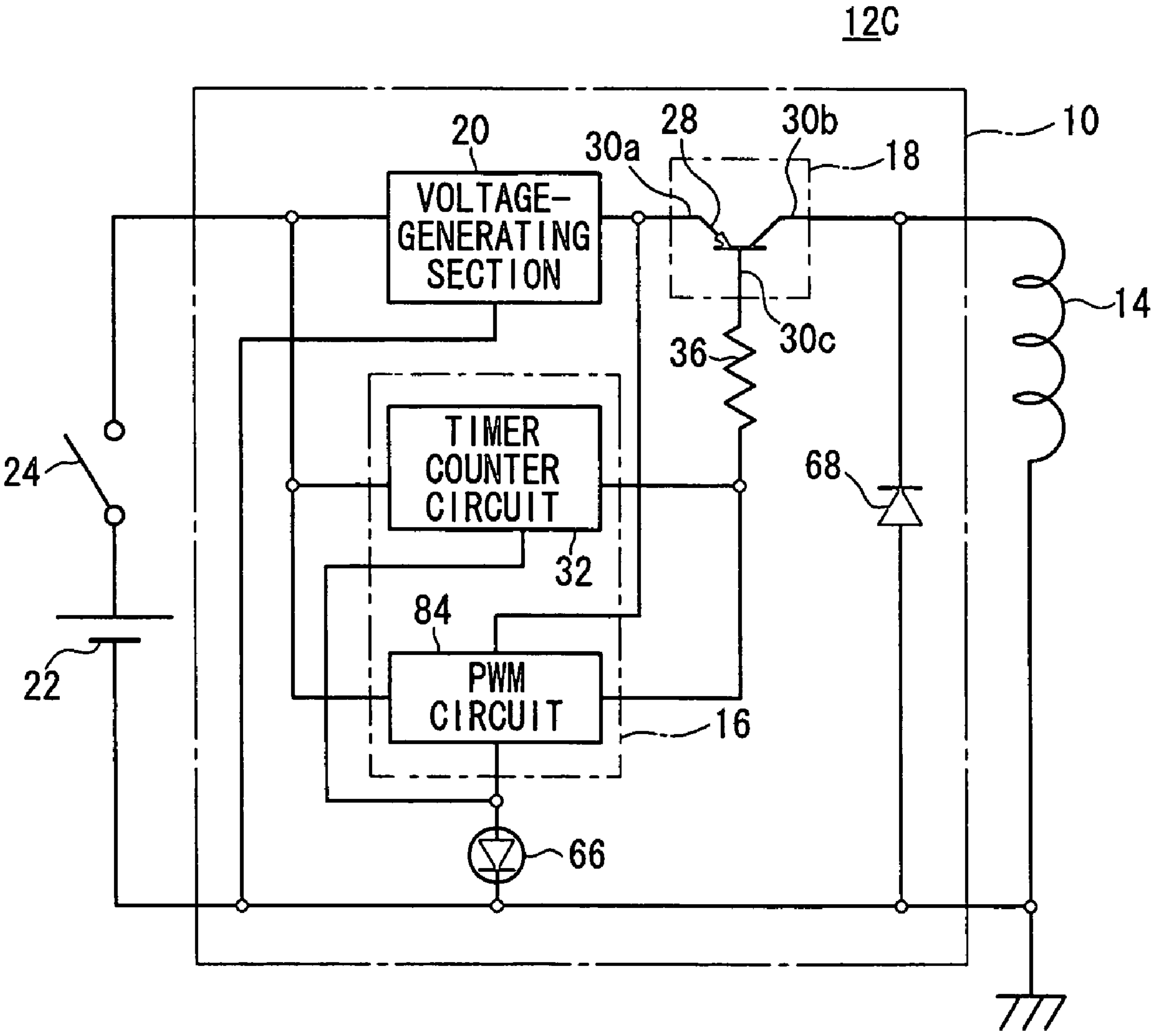
FIG. 9 is a circuit diagram of a solenoid-operated valve according to a third embodiment.
Figures 10A, 10B, 10C, 10D, 10E, 10F:
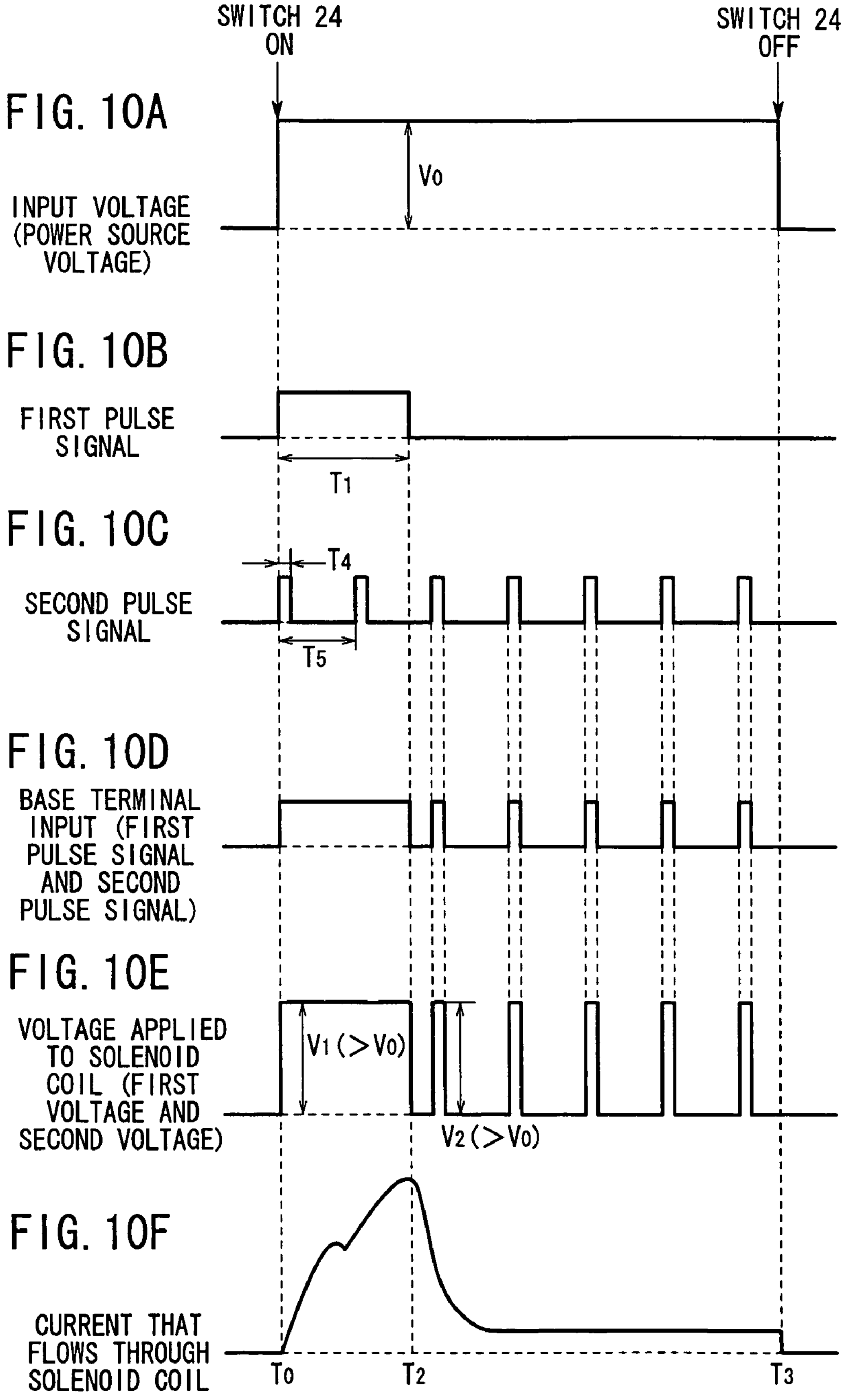
FIG. 10A is a time chart of the power source voltage in the solenoid-operated valve shown in FIG. 9.
FIG. 10B is a time chart of a first pulse signal.
FIG. 10C is a time chart of a second pulse signal.
FIG. 10D is a time chart of a base terminal input.
FIG. 10E is a time chart of the voltage applied to the solenoid coil.
FIG. 10F is a time chart of the current that flows through the solenoid coil.

In this arrangement, when the first pulse signal is output from the output terminal, the timer counter circuit 32 (see FIG. 7) stops the pulse-generating operation after a predetermined period of time (i.e., after the time $T_2$ shown in FIG. 8F).

On the other hand, when the power source voltage $V_0$ is supplied to the PWM circuit 84, the second pulse signal is generated in the PWM circuit 84. The generated second pulse signal is supplied via the resistor 36 to the base terminal 30*c* of the transistor 28 (see FIGS. 8C and 8D).

In this arrangement, the duty ratio and repetition frequency (for example, 1 [kHz] to 100 [kHz]) of the second pulse signal are previously set in the PWM circuit 84. As shown in FIG. 8C, the pulse width $T_4$ of the second pulse signal is set to be smaller than the pulse width $T_1$ (see FIG. 8B) of the first pulse signal ($T_1>T_4$).

When the first pulse signal or the second pulse signal is supplied to the base terminal 30*c* of the transistor 28, in a state in which the switch 24 (see FIG. 7) is closed, an ON state is provided between the emitter terminal 30*a* and the collector terminal 30*b* during a period of time defined by the pulse widths $T_1$, $T_4$ of the first pulse signal or the second pulse signal. The power source voltage $V_0$ is applied as the first voltage $V_1$ (first voltage), or the second voltage $V_2$ (second voltage), to the solenoid coil 14 of the solenoid-operated valve 12B (see FIG. 8E) during the periods of time (pulse widths $T_1$, $T_4$) of the ON state.

The solenoid-operated valve 12B according to the second embodiment is basically constructed as described above. Next, the operation of the solenoid-operated valve 12B shall be explained with reference to FIGS. 7 and 8A to 8F.

Initially, when the switch 24 is closed at time $T_0$, the power source voltage $V_0$ of the DC power source 22 is applied to the timer counter circuit 32 and the PWM circuit 84. As a result, the timer counter circuit 32 and the PWM circuit 84 are initiated.

The timer counter circuit 32 generates the first pulse signal, which has a pulse width $T_1$ of a predetermined time previously set therein, and which has a predetermined pulse voltage previously set in the timer counter circuit 32. The generated first pulse signal is supplied from the output terminal via the resistor 36 to the base terminal 30*c* of the transistor 28.

The timer counter circuit 32 initiates output of the first pulse signal at time $T_0$. Output of the pulse is stopped after time $T_2$, which is later than time $T_0$ by the pulse width $T_1$. The timer counter circuit 32 supplies one pulse, as the first pulse signal, to the base terminal 30*c* of the transistor 28.

On the other hand, the power source voltage $V_0$ is also applied to the PWM circuit 84, and the PWM circuit 84 is initiated. Therefore, the PWM circuit 84 generates a second pulse signal, which has a predetermined repetition frequency previously set therein, and which has a predetermined duty ratio previously set in the PWM circuit 84. The generated second pulse signal is supplied from the output terminal via the resistor 36 to the base terminal 30*c* of the transistor 28.

The repeat cycle $T_5$ (see FIG. 8C) of the second pulse signal is the reciprocal, or an inverse number, of the repetition frequency. The duty ratio of the second pulse signal is $(T_4/T_5)\times 100$[%]. The pulse width $T_4$ of the second pulse signal is smaller than the pulse width $T_1$ of the first pulse signal ($T_1>T_4$). The pulse voltage of the first pulse signal is substantially the same as the pulse voltage of the second pulse signal.

The first pulse signal or the second pulse signal is supplied to the base terminal 30*c* of the transistor 28. An ON state is provided between the emitter terminal 30*a* and the collector terminal 30*b*, during the pulse generation time (pulse widths $T_1$, $T_4$) of the first pulse signal or the second pulse signal, in the transistor 28. As a result, the transistor 28 applies the power source voltage $V_0$, as the first voltage $V_1$, to the solenoid coil 14. The power source voltage $V_0$ is applied, as the second voltage $V_2$, to the solenoid coil 14 during the period of time (pulse width $T_4$) of the ON state after the time $T_2$.

Accordingly, the current that flows through the solenoid coil 14 increases suddenly as time elapses during the time region (pulse width $T_1$) in which the first voltage $V_1$ is applied to the solenoid coil 14. The solenoid-operated valve 12B is quickly driven in accordance with the electromagnetic force caused by the current.

On the other hand, the second voltage $V_2$ is applied to the solenoid coil 14 at intervals of a predetermined period of time (i.e., at intervals of the repeat cycle $T_5$) within the time region after the time $T_2$. Therefore, a current, which is smaller than the current used during driving of the solenoid-operated valve 12B, flows through the solenoid coil 14. Thus, the solenoid coil 14 can maintain the driven state of the solenoid-operated valve 12B using a smaller current.

When the switch 24 is opened at time $T_3$ (see FIG. 8F), application of the power source voltage $V_0$ to the timer counter circuit 32 and the PWM circuit 84 is stopped. Therefore, the timer counter circuit 32 and the PWM circuit 84 are switched from being in a driven state to a stopped state. Supply of the first pulse signal and the second pulse signal to the base terminal 30*c* of the transistor 28 is also stopped.

Accordingly, an OFF state is provided between the emitter terminal 30*a* and the collector terminal 30*b* of the transistor 28. Application of the first voltage $V_1$ or the second voltage $V_2$ to the solenoid coil 14 is consequently stopped as well.

Incidentally, when application of the second voltage $V_2$ to the solenoid coil 14 is stopped, a counter-electromotive force is generated in the solenoid coil 14. However, current resulting from the counter-electromotive force flows through the diode 68, and thus the counter-electromotive force is quickly attenuated. While the first voltage $V_1$ or the second voltage $V_2$ being applied to the solenoid coil 14, the LED 66 emits light in accordance with current that flows through the timer counter circuit 32 or the PWM circuit 84 and the LED 66. Therefore, when light emission from the LED 66 is visually recognized, it is possible to confirm that the first voltage $V_1$ or the second voltage $V_2$ has been applied to the solenoid coil 14, and that the solenoid-operated valve 12B is in a driven state.

As described above, in the solenoid-operated valve 12B according to the second embodiment, a control signal, which corresponds to the first pulse signal and the second pulse signal, is supplied from the switch control section 16 to the switch section 18. Based on the supplied control signal, the switch section 18 performs a time-based control of the electric connection state between the DC power source 22 and the solenoid coil 14.

That is, when the supply time (pulse width $T_1$) of the control signal corresponding to the first pulse signal is extended, then the period of time of the ON state of the switch section 18 is prolonged, the electric energy amount supplied to the solenoid coil 14 is increased, and the solenoid-operated valve 12B can be driven within a short period of time.

On the other hand, when the supply time (pulse width $T_4$) of the control signal corresponding to the second pulse signal $V_2$ is shortened, the period of time of the ON state is also shortened. Therefore, the electric energy amount supplied to the solenoid coil 14 is decreased. The driven state of the solenoid-operated valve 12B can thereby be maintained using a smaller amount of electric energy. Stated otherwise, even if the first voltage $V_1$ and the second voltage $V_2$ are at a level of the power source voltage $V_0$, the driven state of the solenoid-operated valve 12B can be maintained using smaller amount of electric energy, by shortening the pulse width $T_4$ of the second voltage $V_2$.

As described above, the electric energy amount supplied from the DC power source 22 to the solenoid coil 14 can be easily adjusted by performing a time-based control of the ON state of the switch section 18 through the switch control section 16.

In this case, the supply time of the control signal to the switch section 18 defines the application time of the first voltage $V_1$ or the second voltage $V_2$ with respect to the solenoid coil 14. Therefore, when the supply time is adjusted to conform to specifications of the solenoid-operated valve 12B, desired values can be adjusted for the start-up time and the driving time of the solenoid-operated valve 12B, the current that flows through the solenoid coil 14, and the electric energy amount supplied to the solenoid coil 14. As a result, the solenoid-operated valve 12B further reduces the electric power consumption of the solenoid coil 14, as compared with the solenoid-operated valve-driving circuits 200, 220 (see FIGS. 17 and 18). Further, versatility of the solenoid-operated valve 12B can be enhanced.

When the supply time of the control signal from the switch control section 16 to the switch section 18 is appropriately adjusted, the period of time during which the switch section 18 is in an ON state is changed. Therefore, in the event that the solenoid-operated valve 12B is stopped due to a power failure or the like, the solenoid-operated valve 12B can be restarted in a shorter period of time, and/or the solenoid-operated valve 12B can be more quickly changed over into a time region in which the driven state is maintained, as compared with the solenoid-operated valve-driving circuit 220 (see FIG. 18), which is based on use of the charging/discharging time of the capacitor 226 and the resistor 224.

In the solenoid-operated valve 12B, a resistor is not used in the supply line of the power source voltage $V_0$, the first voltage $V_1$, and the second voltage $V_2$. Therefore, overall electric power consumption of the apparatus can be reduced, as compared with the solenoid-operated valve-driving circuit 220. Further, it is unnecessary to provide countermeasures against heat. Therefore, durability of the entire apparatus can be improved, along with reducing production costs.

The period of time during which the switch section 18 is in an ON state is determined by the pulse width $T_1$ of the first pulse signal, which is generated by the timer counter circuit 32, and/or by the pulse width $T_4$ of the second pulse signal, which is generated by the PWM circuit 84. Therefore, it is easy to drive and control the solenoid-operated valve 12B.

When the pulse width $T_1$ of the first pulse signal is made longer than the pulse width $T_4$ of the second pulse signal, then a larger amount of electric energy is supplied to the solenoid coil 14 during the period of time in which the first voltage $V_1$ is applied to the solenoid coil 14, making it possible to quickly drive the solenoid-operated valve 12B. On the other hand, when the pulse width $T_4$ of the second pulse signal is made shorter than the pulse width $T_1$ of the first pulse signal, a smaller amount of electric energy is supplied to the solenoid coil 14, at intervals corresponding to the predetermined time period, during the period of time in which the second voltage $V_2$ is applied to the solenoid coil 14. When PWM control is performed on the first and second pulse signals supplied from the switch control section 16 to the switch section 18 as described above, electric power consumption of the solenoid coil 14 can be further reduced.

Next, an explanation shall be made with reference to FIGS. 9 and 10A to 10F concerning a solenoid-operated valve 12C according to a third embodiment.

The solenoid-operated valve 12C according to the third embodiment is different from the solenoid-operated valves 12A, 12B according to the first and second embodiments (see FIGS. 1 to 8F), in that the switch 24 is electrically connected to the switch section 18 via the voltage-generating section 20, wherein the voltage-generating section 20 generates a DC voltage having a voltage value higher than that of the power source voltage $V_0$.

In this arrangement, when the switch 24 is closed at time $T_0$ (see FIG. 10F), the power source voltage $V_0$ (see FIG. 10A) of the DC power source 22 is applied to the voltage-generating section 20, the timer counter circuit 32, and the PWM circuit 84. As a result, the voltage-generating section 20, the timer counter circuit 32, and the PWM circuit 84 are initiated.

The timer counter circuit 32 generates the first pulse signal. The generated first pulse signal is supplied from the output terminal via the resistor 36 to the base terminal 30*c* of the transistor 28 (see FIGS. 10B and 10D). On the other hand, the PWM circuit 84 generates the second pulse signal. The generated second pulse signal is supplied from the output terminal via the resistor 36 to the base terminal 30*c* of the transistor 28 (see FIGS. 10C and 10D).

In the third embodiment, the switch control section 16 supplies the first pulse signal, having a negative polarity with the pulse width $T_1$, and the second pulse signal, having a negative polarity with the pulse width $T_4$, to the base terminal 30*c*, in the same manner as in the second embodiment (see FIGS. 7 and 8A to 8F). However, as easily understood from the explanations of the first pulse signal, the second pulse signal, and the input of the base terminal 30*c* (first pulse signal and second pulse signal), in FIGS. 10B to 10D, the first pulse signal, the second pulse signal, and the input are inverted so as to have a positive polarity, in conformity with the polarities of the power source voltage $V_0$, the first voltage $V_1$, the second voltage $V_2$, and the current that flows through the solenoid coil 14 (see FIGS. 10A, 10E, and 10F), in the same manner as in FIGS. 3B and 8B to 8D.

The voltage-generating section 20 (see FIG. 9) generates a DC voltage having a voltage value that is higher than that of the power source voltage $V_0$. The generated DC voltage is supplied to the switch section 18.

The first pulse signal or the second pulse signal is supplied to the base terminal 30*c* of the transistor 28. An ON state is provided between the emitter terminal 30*a* and the collector terminal 30*b* of the transistor 28, during the pulse generation time (pulse widths $T_1$, $T_4$) (see FIGS. 10B and 10C) of the first pulse signal or the second pulse signal. As a result, the transistor 28 applies the DC voltage, as a first voltage $V_1$, to the solenoid coil 14. The DC voltage is applied to the solenoid coil 14, as a second voltage $V_2$, during the period of time (pulse width $T_4$) in the ON state after the time $T_2$.

Accordingly, current that flows through the solenoid coil 14 suddenly increases as time elapses within the time region (pulse width $T_1$) during which the first voltage $V_1$ is applied to the solenoid coil 14, and the solenoid-operated valve 12C is quickly driven in accordance with the electromagnetic force caused by the current.

On the other hand, the second voltage $V_2$ is applied to the solenoid coil 14 at intervals having a predetermined period of time (i.e., at intervals defined by the repeat cycle $T_5$), within the time region after the time $T_2$. Therefore, a current, which is smaller than the current used during driving of the solenoid-operated valve 12C, flows through the solenoid coil 14. Thus, the solenoid coil 14 can maintain the driven state of the solenoid-operated valve 12C using a smaller current.

When the switch 24 is opened at time $T_3$ (see FIG. 10F), application of the power source voltage $V_0$ to the voltage-generating section 20, the timer counter circuit 32, and the PWM circuit 84, is stopped. Therefore, the timer counter circuit 32 and the PWM circuit 84 are switched from being in the driven state to a stopped state. Supply of the first pulse signal and the second pulse signal to the base terminal 30*c* of the transistor 28 is also stopped.

Accordingly, an OFF state is provided between the emitter terminal 30*a* and the collector terminal 30*b* of the transistor 28. Application of the first voltage $V_1$ or the second voltage $V_2$ to the solenoid coil 14 is consequently stopped as well.

When supply of the second voltage $V_2$ to the solenoid coil 14 is halted, a counter-electromotive force generated in the solenoid coil 14 is attenuated in the same manner as the solenoid-operated valve 12B according to the second embodiment (see FIG. 7). Also, while the first voltage $V_1$ or the second voltage $V_2$ being applied to the solenoid coil 14, the LED 66 emits light in the same manner as the solenoid-operated valve 12B according to the second embodiment. Therefore, detailed explanation shall be omitted.

As described above, upon start-up of the solenoid-operated valve 12C, a DC voltage, which is larger than the power source voltage $V_0$, is applied to the solenoid coil 14. Accordingly, the electric energy supplied upon start-up is increased, whereby the solenoid-operated valve 12C can be driven in a short period of time. Even if the first voltage $V_1$ and the second voltage $V_2$ are substantially the same level, the driven state of the solenoid-operated valve 12C can be maintained using a smaller electric energy amount, by shortening the pulse width $T_4$ of the second voltage $V_2$.

Next, specific examples of the solenoid-operated valves 12A and 12B described above (first to third specific examples) shall be explained with reference to FIGS. 11 to 15.

Figure 11:
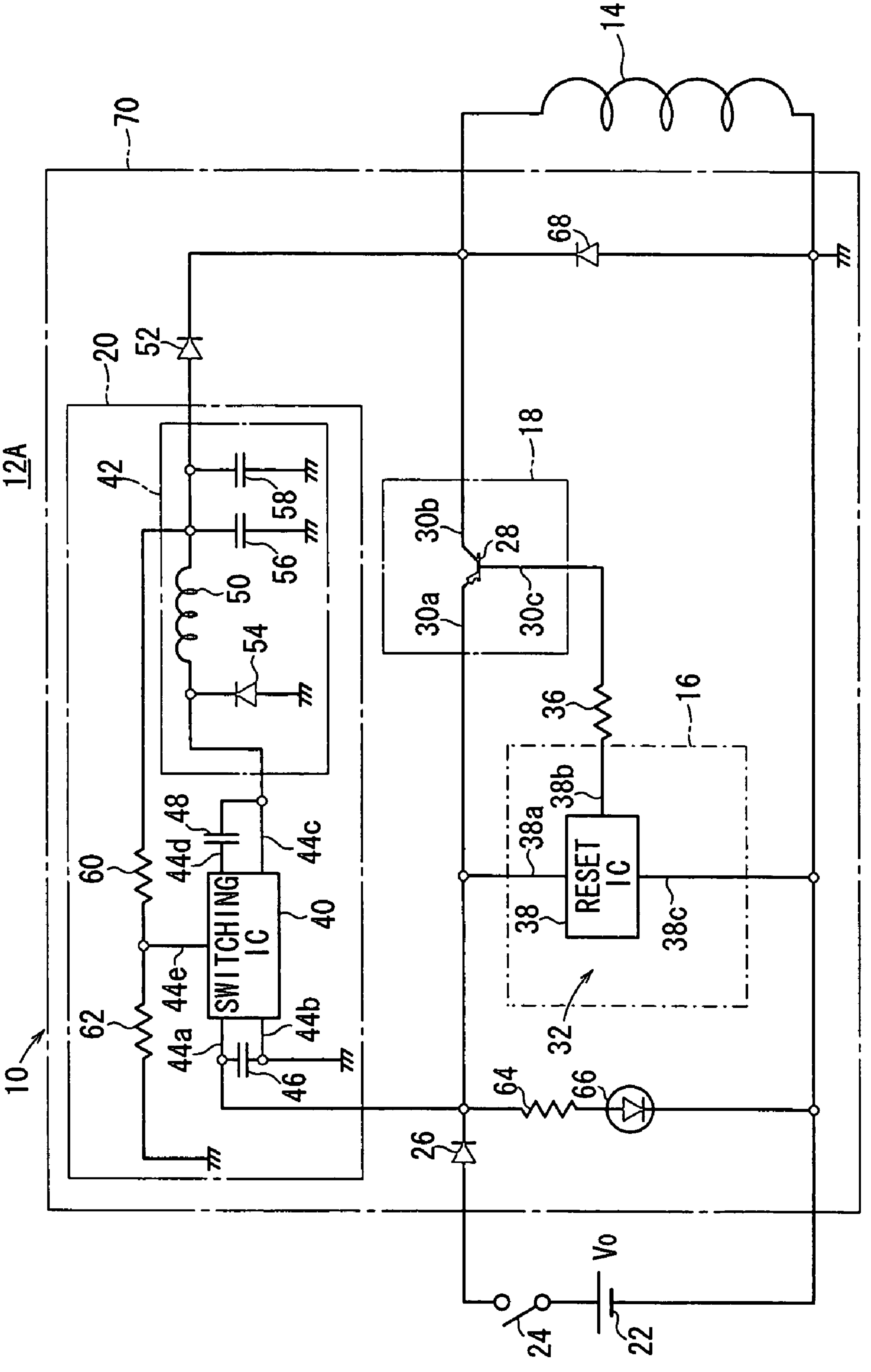
FIG. 11 is a circuit diagram concerning a specific example (first specific example) of the solenoid-operated valve shown in FIG. 1.

FIG. 11 shows a circuit diagram illustrating a specific example (first specific example) of the solenoid-operated valve 12A according to the first embodiment.

In this arrangement, the solenoid-operated valve 12A includes a switch control section 16, a switch section 18, and a voltage-generating section 20. A DC power source 22 is electrically connected to a diode 26 via a switch 24. The diode 26 is electrically connected to an emitter terminal 30*a* of a transistor 28. The diode 26 protects the circuit by blocking current, which would otherwise flow in a direction from the solenoid coil 14 to the positive pole of the DC power source 22.

The collector terminal 30*b* of the transistor 28 is electrically connected to one terminal of the solenoid coil 14.

The switch control section 16 includes a timer counter circuit 32, which is composed of a reset IC 38. An input terminal 38*a* of the reset IC 38 is electrically connected to the diode 26. An output terminal 38*b* of the reset IC 38 is electrically connected to the base terminal 30*c* of the transistor 28 via a resistor 36. A ground terminal 38*c* of the reset IC 38 is grounded.

In this arrangement, the input terminal 38*a* also serves as the power source terminal for the reset IC 38. The reset IC 38 has an unillustrated timer. When a predetermined time elapses (after the time $T_2$ shown in FIG. 3E) after supply of the voltage (time $T_0$ shown in FIG. 3E), generation of the control signal is stopped.

When the switch 24 is closed at time $T_0$ (see FIG. 3E), the power source voltage $V_0$ is applied to the input terminal 38*a* to initiate the reset IC 38. Further, a control signal is generated in the reset IC 38, wherein the generated control signal is supplied via the resistor 36 to the base terminal 30*c* of the transistor 28.

The voltage-generating section 20 includes a switching IC (voltage-adjusting section) 40, which lowers the power source voltage $V_0$ of the DC power source 22 to a predetermined voltage, in order to output a pulse signal that includes the lowered predetermined voltage at intervals corresponding to the predetermined period of time. A smoothing circuit 42 is also included, which smoothes the pulse signal, in order to generate the second voltage $V_2$. An input terminal 44*a* of the switching IC 40 is electrically connected to the diode 26, and a ground terminal 44*b* of the switching IC 40 is grounded. A capacitor 46 is electrically connected between the input terminal 44*a* and the ground terminal 44*b*. The capacitor 46 is a bypass capacitor, which removes high frequency components contained in the power source voltage $V_0$ applied to the input terminal 44*a*.

A capacitor 48 is electrically connected to an output terminal 44*c* and a boost terminal 44*d* of the switching IC 40. The capacitor 48 is a boost capacitor, which ensures that the switching IC 40 reliably performs the switching operation, in order to output the pulse signal from the output terminal 44*c* when the power source voltage $V_0$ is applied to the input terminal 44*a*.

In the smoothing circuit 42, a coil 50 is electrically connected to the output terminal 44*c*. The coil 50 is electrically connected to the solenoid coil 14 via a diode 52. Further, in this arrangement, the coil 50 is grounded on the side of the output terminal 44*c* via a diode 54. On the other hand, the coil 50 is grounded on the side of the diode 52 via a parallel circuit made up of capacitors 56 and 58. The coil 50 is electrically connected on the side of the diode 52 to a feedback terminal 44*e* of the switching IC 40 via a resistor 60. The feedback terminal 44*e* further is grounded via a resistor 62.

A portion of the second voltage $V_2$ is applied as the feedback voltage to the feedback terminal 44*e*. In this arrangement, the magnitude of the feedback voltage is determined by the resistance values of the resistors 60 and 62. The diode 52 protects the circuit by blocking current, which would otherwise flow in a direction from the solenoid coil 14 to the voltage-generating section 20.

The switch section 18 is composed of the transistor 28. When the control signal is supplied from the switch control section 16 to the base terminal 30*c* of the transistor 28, an ON state is provided between the emitter terminal 30*a* and the collector terminal 30*b* during a period of time defined by the pulse width $T_1$ of the control signal (see FIG. 3B). The power source voltage $V_0$ is applied as a first voltage $V_1$ (see FIG. 3D), during the period of time of the pulse width $T_1$, to the solenoid coil 14 of the solenoid-operated valve 12A. On the other hand, an OFF state is provided between the emitter terminal 30*a* and the collector terminal 30*b* during a period of time in which supply of the control signal is stopped after time $T_2$ (see FIG. 3E). The second voltage $V_2$, which is generated by the voltage-generating section 20, is applied to the solenoid coil 14 of the solenoid-operated valve 12A.

The resistor 64 and the LED 66 are electrically connected in parallel to the switch control section 16.

When the first voltage $V_1$ or the second voltage $V_2$ is applied to the solenoid coil 14, the LED 66 emits light in accordance with current that flows through the resistor 64 and the LED 66. Therefore, when light emission from the LED 66 is visually recognized, it is possible to confirm that the first voltage $V_1$ or the second voltage $V_2$ has been applied to the solenoid coil 14, and that the solenoid-operated valve 12A is in a driven state.

When application of the first voltage $V_1$ or the second voltage $V_2$ to the solenoid coil 14 is stopped, a counter-electromotive force is generated in the solenoid coil 14. However, current resulting from the counter-electromotive force flows through the diode 68, and thus the counter-electromotive force is quickly attenuated.

The switch control section 16, the switch section 18, the voltage-generating section 20, the diodes 26, 52, 68, the resistor 64, and the LED 66, are mounted respectively on a substrate 70.

As described above, in the first specific example, the voltage-generating section 20, which serves as a switching power source, includes the switching IC 40 and the smoothing circuit 42. Accordingly, time-based variations or fluctuations in the second voltage $V_2$ are suppressed. The driven state of the solenoid-operated valve 12A can be maintained using a smaller amount of electric power consumption.

When the timer counter circuit 32 includes the reset IC 38, the control signal is generated utilizing the power source voltage $V_0$. Therefore, it is unnecessary to provide an exclusive power source, which would otherwise be required to generate the control signal. Therefore, the solenoid-operated valve-driving circuit 10 can be made smaller in size. The pulse width $T_1$ of the control signal, i.e., the period of time during which the transistor 28 is in the ON state (i.e., period of time of application of the first voltage $V_1$ to the solenoid coil 14) is determined by stopping generation of the control signal by the reset IC 38. Therefore, the solenoid-operated valve 12A can be driven and controlled with ease.

Figure 12:
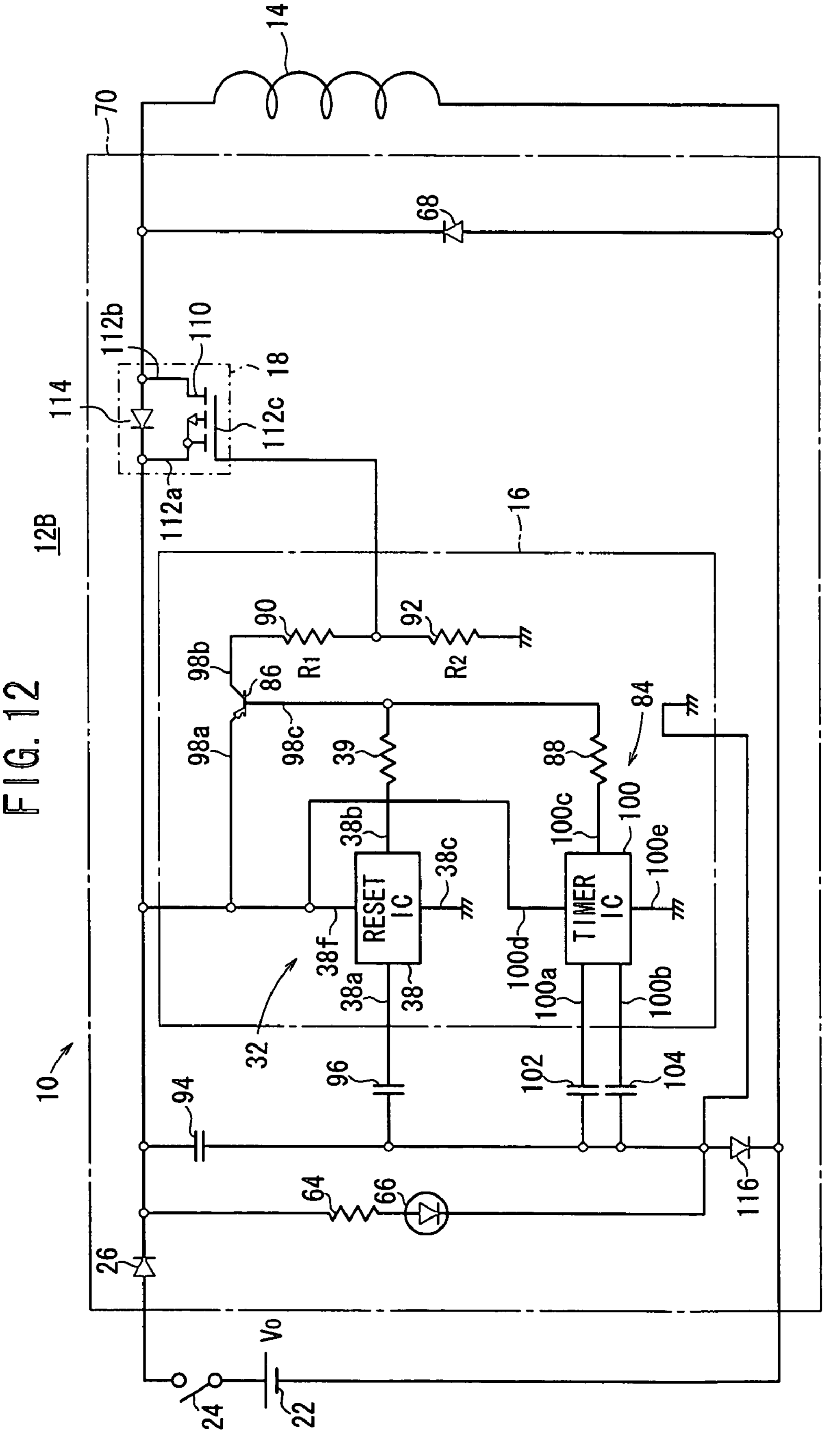
FIG. 12 is a circuit diagram concerning a specific example (second specific example) of the solenoid-operated valve shown in FIG. 7.

FIG. 12 shows a circuit diagram illustrating a specific example (second specific example) of the solenoid-operated valve 12B according to the second embodiment.

In this arrangement, the solenoid-operated valve 12B includes a switch control section 16, which is composed of a custom-type IC containing a timer counter circuit 32, a PWM circuit 84, a PNP-type transistor 86, and resistors 39 and 88 to 92 electrically connected thereto.

More specifically, in the switch control section 16, the timer counter circuit 32 is composed of a reset IC 38 and the resistor 39. An input terminal 38*a* of the reset IC 38 is electrically connected to a diode 26 via capacitors 94 and 96. On the other hand, an output terminal 38*b* thereof is electrically connected via the resistor 39 to a base terminal 98*c* of the transistor 86. A power source terminal 38*f* of the reset IC 38 is electrically connected to the diode 26. On the other hand, a ground terminal 38*c* of the reset IC 38 is grounded. Capacitor 94 is a bypass capacitor, which removes high frequency components contained in the power source voltage $V_0$ when the switch 24 is closed at time $T_0$ (see FIG. 8F).

The PWM circuit 84 is composed of a timer IC 100 and the resistor 88. A first input terminal 100*a* of the timer IC 100 is electrically connected to the capacitor 94 via a capacitor 102. A second input terminal 100*b* is electrically connected to the capacitor 94 via a capacitor 104. On the other hand, an output terminal 100*c* of the timer IC 100 is electrically connected via the resistor 88 to the base terminal 98*c* of the transistor 86. A power source terminal 100*d* of the timer IC 100 is electrically connected to the diode 26. On the other hand, a ground terminal 100*e* of the timer IC 100 is grounded.

The timer IC 100 contains an unillustrated timer. The second pulse signal, which has a pulse width $T_4$ (see FIG. 8C), is generated at intervals corresponding to the repeat cycle $T_5$, after supply (time $T_0$ shown in FIG. 8F) of the power source voltage $V_0$.

Resistors 39 and 88 are bias resistors provided for the transistor 86.

In this arrangement, when the switch 24 is closed at time $T_0$, the power source voltage $V_0$ is applied to the power source terminals 38*f*, 100*d*, whereby the reset IC 38 and the timer IC 100 are initiated.

When the power source voltage $V_0$ is applied to the input terminal 38*a* of the reset IC 38 from the DC power source 22, via the switch 24, the diode 26, and the capacitors 94 and 96 following initiation of the reset IC 38, the first pulse signal is generated. The generated first pulse signal is supplied via the resistor 39 to the base terminal 98*c* of the transistor 86.

In this arrangement, the pulse width $T_1$ of the first pulse signal can be changed by adjusting the capacitance of the capacitor 96.

On the other hand, when the power source voltage $V_0$ is supplied to the first input terminal 100*a* of the timer IC 100 from the DC power source 22, via the switch 24, the diode 26, and the capacitors 94 and 102 following initiation of the timer IC 100, and the power source voltage $V_0$ is supplied to the second input terminal 100*b* via the capacitors 94 and 104, then the second pulse signal is generated in the timer IC 100. The generated second pulse signal is supplied via the resistor 88 to the base terminal 98*c* of the transistor 86.

In this arrangement, the repetition frequency of the second pulse signal can be changed by adjusting the capacitance of the capacitor 102. On the other hand, the duty ratio thereof can be changed by adjusting the capacitance of the capacitor 104.

The emitter terminal 98*a* of the transistor 86 is electrically connected to the diode 26, and the collector terminal 98*b* is grounded via resistors 90 and 92. Resistors 90 and 92 are electrically connected to a gate terminal (third terminal) 112*c* of an enhancement type P-channel MOSFET 110, which constitutes the switch section 18.

In this arrangement, the base terminal 98*c* of the transistor 86 is electrically connected, in a wired OR formation, to the output terminal 38*b* of the reset IC 38 and to the output terminal 100*c* of the PWM circuit 84. Therefore, when the solenoid-operated valve 12B is in a driven state, either the first pulse signal or the second pulse signal is supplied to the base terminal 98_c_ of the transistor 86.

When the first pulse signal or the second pulse signal is supplied to the base terminal 98_c_ of the transistor 86, during a state in which the switch 24 is closed, an ON state is provided between the emitter terminal 98_a_ and the collector terminal 98_b_ during periods of time corresponding to the pulse widths $T_1$, $T_4$ of the first pulse signal or the second pulse signal (see FIGS. 8B and 8C). The power source voltage $V_0$ is applied to the serial circuit of resistors 90 and 92 during the ON state (i.e., during each pulse width $T_1$, $T_4$). As a result, the pulse signal, which has a pulse width corresponding to the ON state, and which has a pulse voltage applied to the resistor 92 as a result of voltage division of the serial circuit, is supplied as a control signal to the gate terminal 112_c_ of the MOSFET 110.

As in the case of the switch section 18 shown in FIG. 2, the switch section 18 is composed of a MOSFET 110 and a diode 114. A source terminal (first terminal) 112_a_ of the MOSFET 110 is electrically connected to the diode 26. On the other hand, a drain terminal (second terminal) 112_b_ thereof is electrically connected to the solenoid coil 14.

In FIG. 12, when the control signal is supplied from the switch control section 16 to the gate terminal 112_c_ of the MOSFET 110, as shown in FIGS. 8B and 8C, an ON state is provided between the source terminal 112_a_ and the drain terminal 112_b_ during the period of time corresponding to the pulse widths of the control signal, i.e., the pulse width $T_1$ of the first pulse signal or the pulse width $T_4$ of the second pulse signal. The power source voltage $V_0$ is applied as the first voltage $V_1$ (first voltage) or the second voltage $V_2$ (second voltage) to the solenoid coil 14 of the solenoid-operated valve 12B, during periods of time defined by pulse widths $T_1$ and $T_4$.

A diode 116 is electrically connected between the negative pole of the DC power source 22 and the capacitor 94. The diode 116 protects the circuit by blocking current, which would otherwise flow in a direction from the negative pole of the DC power source 22 toward the capacitor 94. The anode side of the diode 116 is grounded.

The resistor 64 and LED 66 are electrically connected in parallel to the switch control section 16. The diode 68 is electrically connected in parallel to the solenoid coil 14.

The switch control section 16, the switch section 18, the diodes 26, 68, 116, the resistor 64, the LED 66, and the respective capacitors 94, 96, 102, 104 are mounted respectively on a substrate 70.

As described above, in the second specific example, the pulse width $T_1$ of the first pulse signal can be modified by adjusting the capacitance of the capacitor 96. Therefore, initiation of the solenoid-operated valve 12B can be efficiently controlled. Further, the repetition frequency of the second pulse signal can be modified by adjusting the capacitance of the capacitor 102, and further, the duty ratio of the second pulse signal can be modified by adjusting the capacitance of the capacitor 104. Therefore, for example, when the repetition frequency is increased so as to be high, fluctuations in the current flowing through the solenoid coil 14 can be suppressed, during the time region (time $T_2$ to time $T_3$) in which the driven state of the solenoid-operated valve 12B is maintained. It is also possible to reduce electric power consumption of the solenoid coil 14. Further, since the duty ratio can also be adjusted, it is possible to efficiently maintain the driven state of the solenoid-operated valve 12B.

As described above, the pulse width $T_1$ of the first pulse signal, the repetition frequency of the second pulse signal, and the duty ratio are changed by the capacitances of the capacitors 96, 102 and 104. Therefore, even if the voltage value of the power source voltage $V_0$ is changed, depending on the specifications of the solenoid-operated valve 12B, the pulse width $T_1$, the repetition frequency, and the duty ratio can be maintained and are not fluctuated. In other words, even when the voltage value of the power source voltage $V_0$ is changed, it is possible to stably operate the switch control section 16 and the switch section 18. As a result, a wide voltage range (range of the power source voltage $V_0$) can be utilized by the solenoid-operated valve-driving circuit 10.

Further, it is possible to reduce impedance of the semiconductor element making up the switch section 18, by arranging the MOSFET 110 within the switch section 18.

Figure 13:
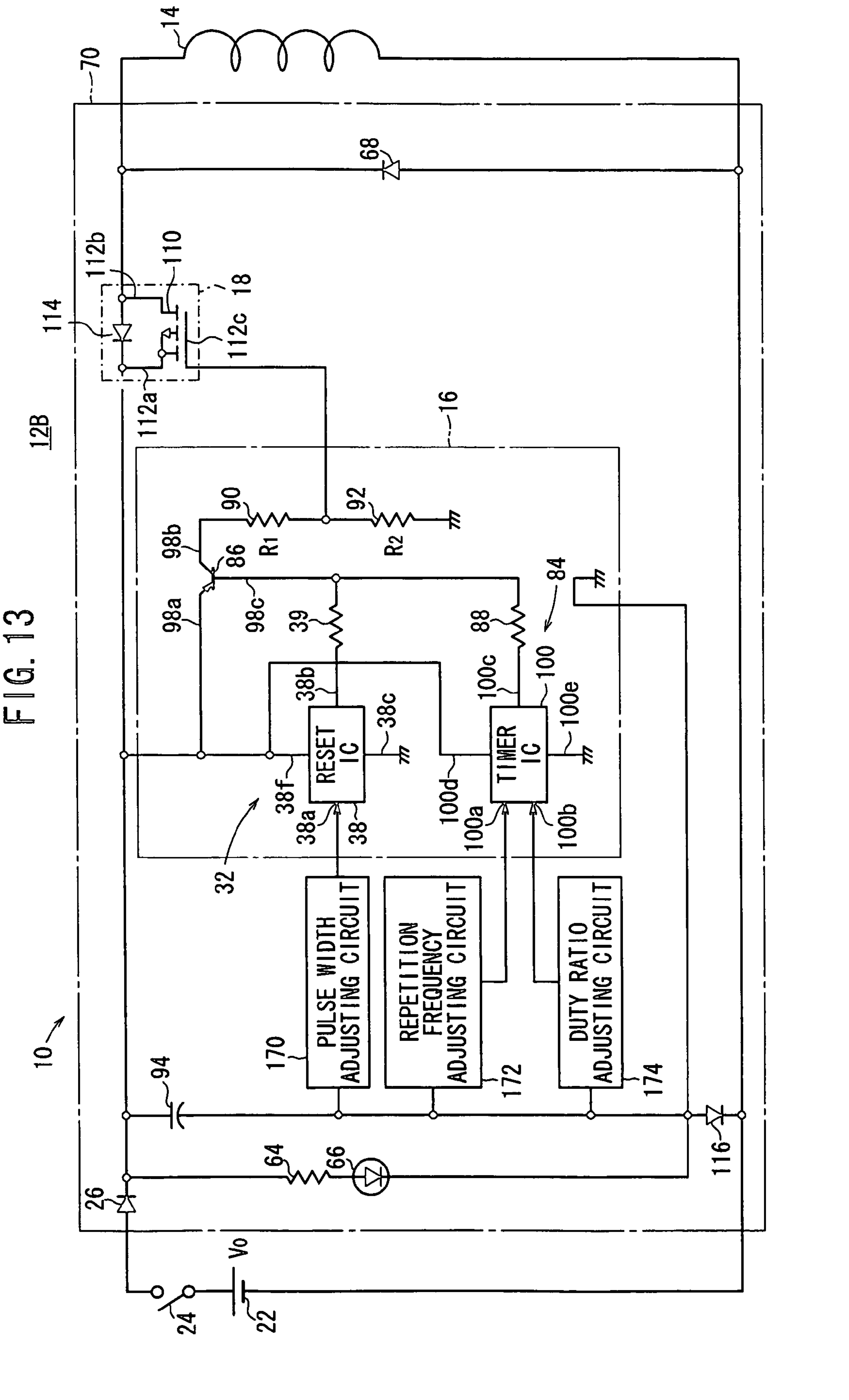
FIG. 13 is a circuit diagram of the solenoid-operated valve where a pulse width adjusting circuit, a repetition frequency adjusting circuit and a duty ratio adjusting circuit are arranged in the solenoid-operated valve-driving circuit in FIG. 12.

In the second specific example described above (see FIG. 12), the pulse width $T_1$ of the first pulse signal, the repetition frequency of the second pulse signal, and the duty ratio of the second pulse signal are modified by adjusting the capacitances of the capacitors 96, 102, and 104, respectively. However, in place of this arrangement, a pulse width adjusting circuit 170 for adjusting the pulse width $T_1$, a repetition frequency adjusting circuit 172 for adjusting the repetition frequency, and a duty ratio adjusting circuit 174 for adjusting the duty ratio, as shown in FIG. 13, can be arranged in the solenoid-operated valve-driving circuit 10. The pulse width adjusting circuit 170 includes a memory which stores data of the pulse width $T_1$. The repetition frequency adjusting circuit 172 includes a memory which stores data of the repetition frequency. The duty ratio adjusting circuit 174 includes a memory which stores data of the duty ratio. The data read from each of the memories are output to the reset IC 38 or the timer IC 100. Accordingly, the data stored in the memories can be changed depending on the specifications of the solenoid-operated valve 12B, in order to set desired values for the pulse width $T_1$ of the first pulse signal, the repetition frequency of the second pulse signal, and the duty ratio.

Figure 14:
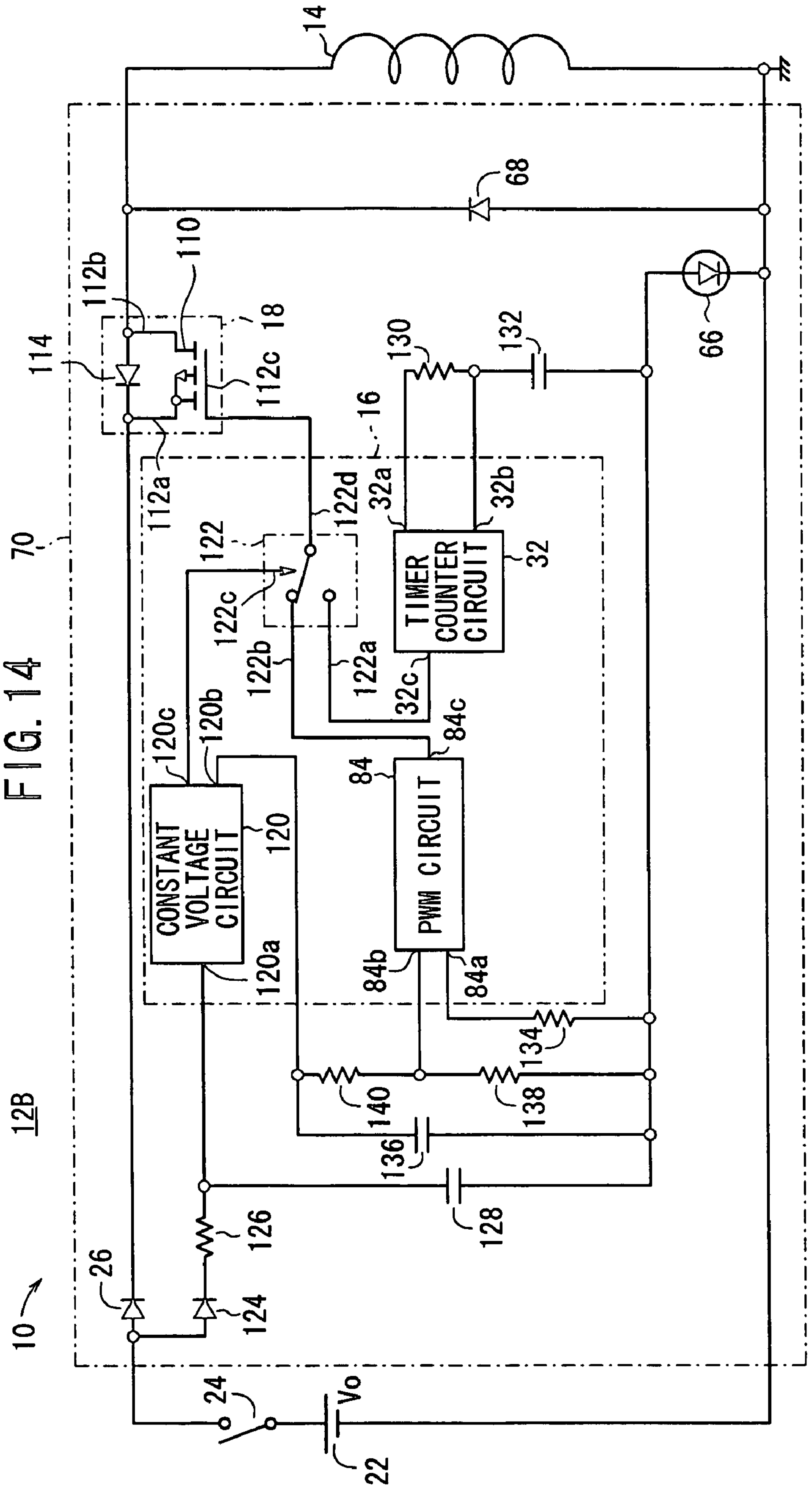
FIG. 14 is a circuit diagram concerning another specific example (third specific example) of the solenoid-operated valve shown in FIG. 7.

FIG. 14 shows a circuit diagram illustrating another specific example (third specific example) of the solenoid-operated valve 12B according to the second embodiment.

The third specific example differs from the second specific example (see FIGS. 12 and 13) in that the switch control section 16 is composed of a custom-type IC, containing a timer counter circuit 32, a PWM circuit 84, a constant voltage circuit 120, and a switch 122, wherein a diode 124 and a resistor 126 for restricting current inrush are electrically connected to an input side of the switch control section 16, a resistor 130 and a capacitor 132 are electrically connected to an input side of the timer counter circuit 32, and resistors 134, 138, 140 are electrically connected to an input side of the PWM circuit 84.

In this arrangement, an input terminal 120_a_ of the constant voltage circuit 120 is electrically connected to the switch 24 via the resistor 126 and the diode 124. A first output terminal 120_b_ thereof is electrically connected to a capacitor 136 and the resistor 140, and a second output terminal 120_c_ thereof is electrically connected to a voltage control terminal 122_c_ of the switch 122. A first input terminal 32_a_ of the timer counter circuit 32 is electrically connected to one end of the resistor 130. A second input terminal 32_b_ thereof is electrically connected to the other end of the resistor 130 and the capacitor 132. An output terminal 32_c_ thereof is electrically connected to a first input terminal 122_a_ of the switch 122. Further, a first input terminal 84_a_ of the PWM circuit 84 is electrically connected to a resistor 134. A second input terminal 84_b_ thereof is electrically connected to resistors 138 and 140. An output terminal 84_c_ thereof is electrically connected to a second input terminal 122_b_ of the switch 122. Further, an output terminal 122*d* of the switch 122 is electrically connected to a gate terminal 112*c* of the MOSFET 110.

The resistor 126 is grounded via a capacitor 128 and the LED 66. A first output terminal 120*b* of the constant voltage circuit 120 is grounded through the capacitor 136 and the LED 66, with the resistors 134, 138 and the capacitor 132 being grounded through the LED 66 as well. A diode 68 is electrically connected in parallel to the solenoid coil 14.

When the switch 24 is in an ON state, the constant voltage circuit 120 initiates the timer counter circuit 32 and the PWM circuit 84 on the basis of the power source voltage $V_0$ applied to the input terminal 120*a*. The power source voltage $V_0$ is supplied from the second output terminal 120*c* to the voltage control terminal 122*c* during a predetermined period of time (i.e., time $T_0$ to time $T_2$, as shown in FIG. 15E). A predetermined voltage is supplied from the first output terminal 120*b* to the capacitor 136 and to the resistor 140.

The diode 124 protects the circuit by blocking current which otherwise would flow in a direction from the resistor 126 toward the positive pole of the DC power source 22.

The resistor 126 restricts inrush of current, in order that large currents (inrush current), which are generated when the switch 24 is in an ON state (time $T_0$ shown in FIG. 15E), are prevented from flowing into the switch control section 16.

In this arrangement, the intermittent discontinuity time of the switch control section 16 (solenoid-operated valve-driving circuit 10) can be modified by adjusting the capacitance of the capacitor 128. The pulse width $T_1$ (see FIG. 15A) of the first pulse signal can also be modified by adjusting the resistance value of the resistor 130 and the capacitance of the capacitor 132. Further, the repetition frequency of the second pulse signal (see FIG. 15B) can be modified by adjusting the resistance value of the resistor 134. Still further, the duty ratio of the second pulse signal can be modified by adjusting the resistance values of resistors 138 and 140. The capacitor 136 is a bypass capacitor, which removes high frequency components contained within the voltage.

The switch 122 provides an ON state between the first input terminal 122*a* and the output terminal 122*d* during a period of time (time $T_0$ to time $T_2$, as shown in FIG. 15E) in which the power source voltage $V_0$ is supplied from the constant voltage circuit 120 to the voltage control terminal 122*c*. The first pulse signal from the output terminal 84*c* of the timer counter circuit 32 is supplied to the gate terminal 112*c* of the MOSFET 110. The switch 122 provides an ON state between the second input terminal 122*b* and the output terminal 122*d* during a period of time (period of time after time $T_2$, as shown in FIG. 15E) in which the power source voltage $V_0$ is not supplied to the voltage control terminal 122*c*. The second pulse signal from the output terminal 84*c* of the PWM circuit 84 is output to the gate terminal 112*c* of the MOSFET 110.

More specifically, as shown in FIGS. 15A to 15E, when the switch 24 (see FIG. 14) is closed at time $T_0$, the power source voltage $V_0$ is applied to the input terminal 120*a* of the constant voltage circuit 120. As a result, the timer counter circuit 32 and the PWM circuit 84 are initiated. The power source voltage $V_0$ is supplied from the second output terminal 120*c* of the constant voltage circuit 120 to the voltage control terminal 122*c* of the switch 122. An ON state is provided between the output terminal 122*d* and the first input terminal 122*a* of the switch 122.

Figure 15A:
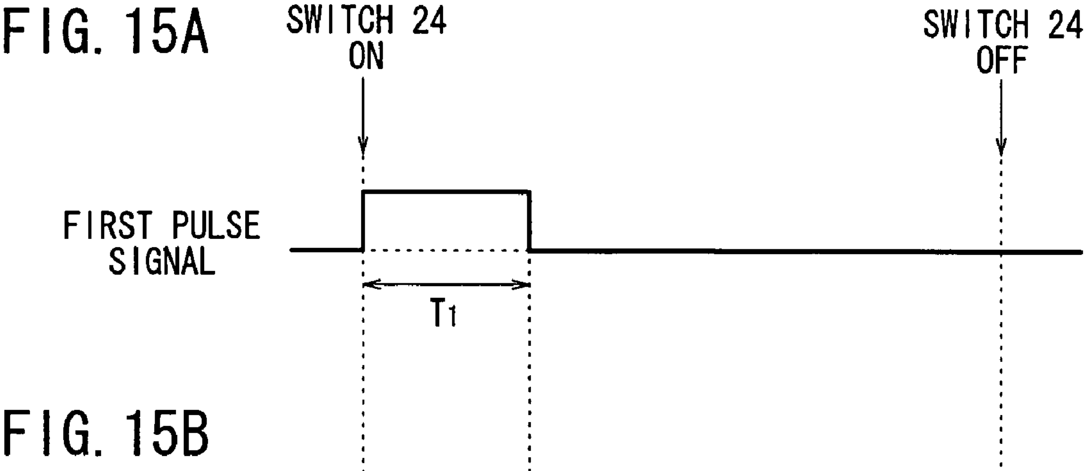
FIG. 15A is a time chart of a first pulse signal in the solenoid-operated valve shown in FIG. 14.

When the power source voltage $V_0$ is supplied from the DC power source 22 to the first and second input terminals 32*a*, 32*b* via the switch 24, the diode 124, the resistor 126, and the capacitors 128, 132 (including the resistor 130), during a state in which the timer counter circuit 32 has been initiated, the timer counter circuit 32 generates a first pulse signal having a pulse width $T_1$ (see FIG. 15A). The generated first pulse signal is supplied from the output terminal 32*c* to the first input terminal 122*a* of the switch 122.

Figure 15B:
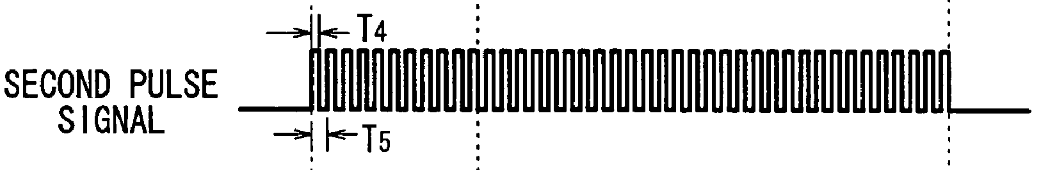
FIG. 15B is a time chart of a second pulse signal.
Figure 15C:
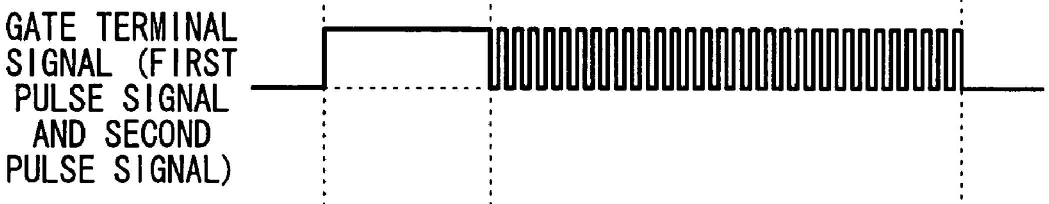
FIG. 15C is a time chart of a gate terminal input.
Figure 15D:
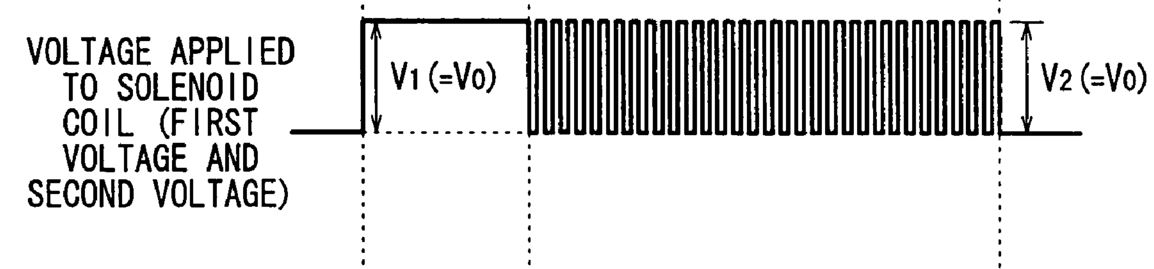
FIG. 15D is a time chart of the voltage applied to the solenoid coil.
Figure 15E:
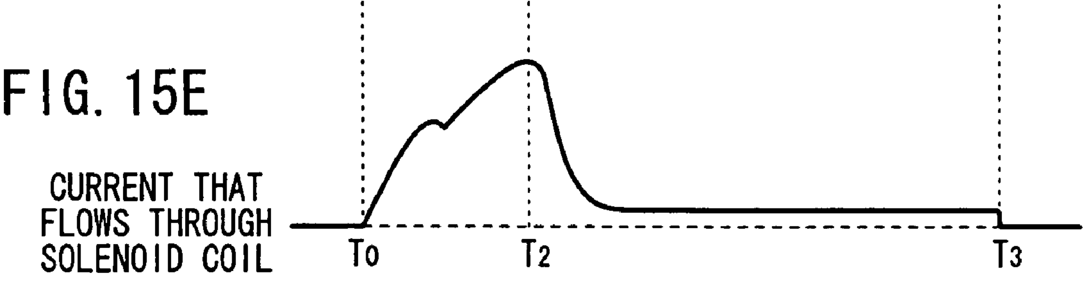
FIG. 15E is a time chart of the current that flows through the solenoid coil.

On the other hand, when the power source voltage $V_0$ is supplied to the first input terminal 84*a* from the DC power source 22 via the switch 24, the diode 124, the resistor 126, the capacitor 128, and the resistor 134, in a state in which the PWM circuit 84 has been initiated, and the voltage is supplied to the second input terminal 84*b* from the first output terminal 120*b* of the constant voltage circuit 120 via the resistor 140, then the PWM circuit 84 generates a second pulse signal having a pulse width $T_4$ and a repeat cycle $T_5$ (see FIG. 15B). The generated pulse signal is supplied from the output terminal 32*c* to the second input terminal 122*b* of the switch 122.

In this arrangement, the switch 122 supplies the first pulse signal to the gate terminal 112*c* of the MOSFET 110 during the period of time from time $T_0$ to time $T_2$ (see FIG. 15E). On the other hand, supply of the power source voltage $V_0$ from the constant voltage circuit 120 to the voltage control terminal 122*c* is halted during the period of time from time $T_2$ to time $T_3$. An ON state is provided between the second input terminal 122*b* and the output terminal 122*d*. Therefore, the second pulse signal is supplied to the gate terminal 112*c* of the MOSFET 110.

The MOSFET 110 provides an ON state between the source terminal 112*a* and the drain terminal 112*b*, for a period of time corresponding to the pulse width $T_1$ of the first pulse signal, or the pulse width $T_4$ of the second pulse signal. The power source voltage $V_0$ is applied, as a first voltage $V_1$ (first voltage), or as a second voltage $V_2$ (second voltage), to the solenoid coil 14 of the solenoid-operated valve 12B, during periods of time corresponding to the pulse widths $T_1$ and $T_4$.

In the third specific example, the switch control section 16 supplies, to the gate terminal 112*c*, a first pulse signal having a negative polarity and a pulse width $T_1$, and a second pulse signal having a negative polarity and a pulse width $T_1$. However, in FIGS. 15A to 15C, as easily understood from the explanation of the first pulse signal, the second pulse signal, and the input of the gate terminal 112*c* (first pulse signal and second pulse signal), the first pulse signal, the second pulse signal, and the input are illustrated as being inverted with a positive polarity in conformity with the polarity of the power source voltage $V_0$, the first voltage $V_1$, the second voltage $V_2$, and the current (see FIGS. 15D and 15E) that flows through the solenoid coil 14, in the same manner as shown in FIGS. 3B, 8B to 8D, and 10B to 10D.

The switch control section 16, the switch section 18, the diodes 26, 68, 124, the LED 66, the resistors 126, 130, 138, 140, and the capacitors 128, 132, 136 are mounted respectively on a substrate 70.

As described above, in the third specific example, a large current (inrush current) generated when the solenoid-operated valve 12B is initiated (when switch 24 is in an ON state) can be prevented from flowing into the switch control section 16, by providing a resistor 126 for restricting the inrush current. As a result, it is possible to avoid influence exerted on the switch control section 16 (control signal) by fluctuations in the power source voltage $V_0$ caused by the inrush current.

The solenoid-operated valve 12B can be restarted quickly after intermittent discontinuity thereof, through modifying the intermittent discontinuity time of the switch control section 16, by adjusting the capacitance of the capacitor 128.

Control of the solenoid-operated valve 12B on start-up can be efficiently performed through modifying the pulse width $T_1$ of the first pulse signal, by adjusting the resistance value of the resistor 130 and the capacitance of the capacitor 132.

It is possible to suppress fluctuations in current flowing through the solenoid coil 14 during the time region (i.e., period of time from time $T_2$ to time $T_3$) in which the driven state of the solenoid-operated valve 12B is maintained, through modifying the repetition frequency of the second pulse signal, by adjusting the resistance value of the resistor 134. Thus, it is possible to further reduce electric power consumption of the solenoid coil 14. The driven state of the solenoid-operated valve 12B can be efficiently maintained through modifying the duty ratio of the second pulse signal, by adjusting the resistance values of resistors 138 and 140.

As described above, in the third specific example, the pulse width $T_1$ of the first pulse signal, the repetition frequency of the second pulse signal, and the duty ratio are modified by means of adjusting the capacitances of the capacitors 128, 132 and the resistance values of the resistors 130, 134, 138, 140. Therefore, the pulse width $T_1$, the repetition frequency, and the duty ratio do not fluctuate, even when the voltage value of the power source voltage $V_0$ is changed depending on the specifications of the solenoid-operated valve 12B, in the same manner as in the second specific example (see FIGS. 12 and 13). In other words, even when the voltage value of the power source voltage $V_0$ is changed, the switch control section 16 and the switch section 18 can be operated in a stable manner. As a result, the range of voltages used by the solenoid-operated valve-driving circuit 10 (range of the power source voltage $V_0$) can be widened.

Figure 16:
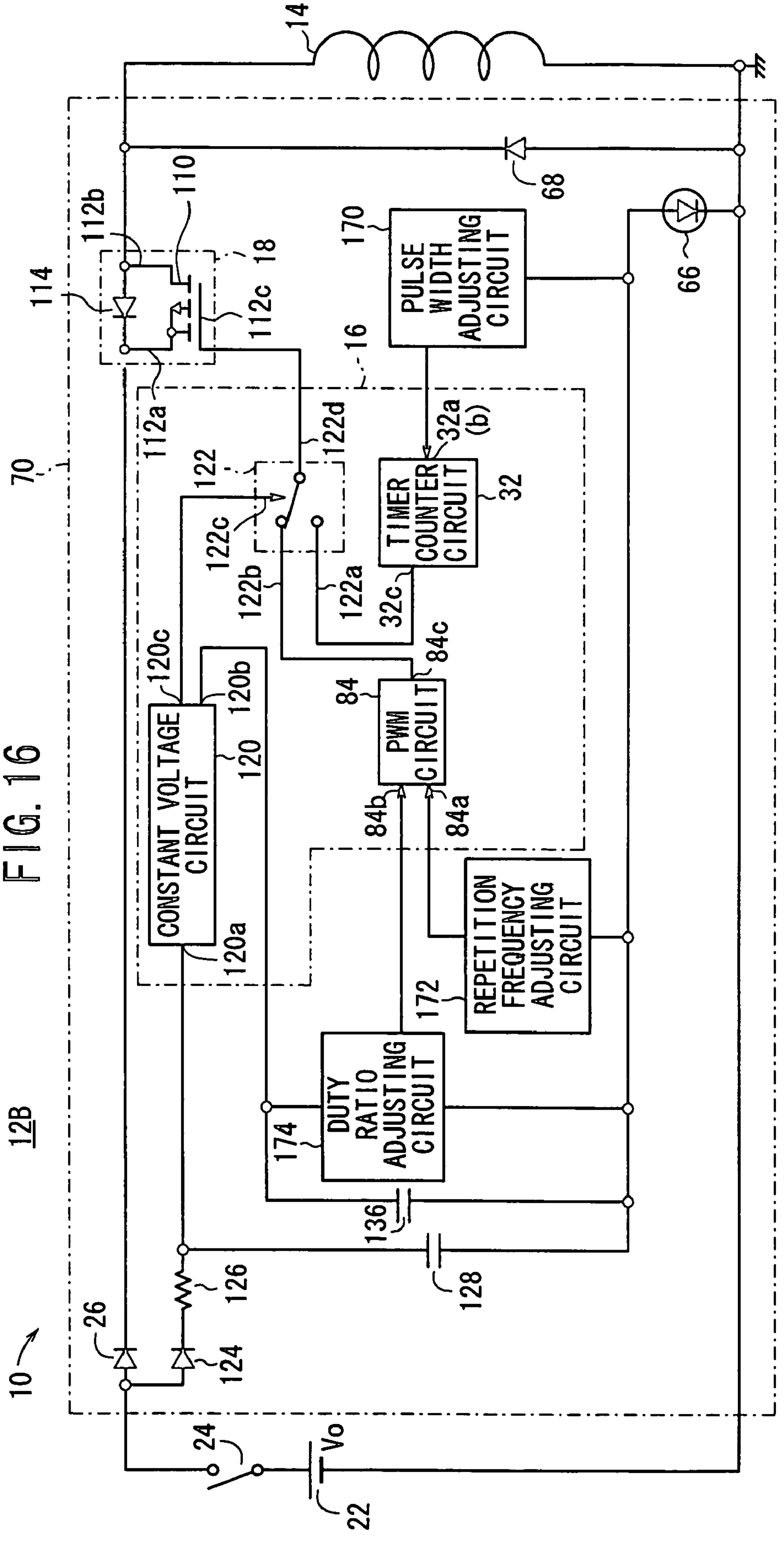
FIG. 16 is a circuit diagram of the solenoid-operated valve where the pulse width adjusting circuit, a repetition frequency adjusting circuit and a duty ratio adjusting circuit are arranged in the solenoid-operated valve-driving circuit in FIG. 14.

In the third specific example described above (see FIG. 14), as with FIG. 13, in place of the resistors 130, 134, 138 and 140, and the capacitor 132, a pulse width adjusting circuit 170 for adjusting the pulse width $T_1$, a repetition frequency adjusting circuit 172 for adjusting the repetition frequency, and a duty ratio adjusting circuit 174 for adjusting the duty ratio, as shown in FIG. 16, can be arranged in the solenoid-operated valve-driving circuit 10. In this case, the data stored in each memory of the pulse width adjusting circuit 170, the repetition frequency adjusting circuit 172, and the duty ratio adjusting circuit 174, can be changed depending on the specifications of the solenoid-operated valve 12B, in order to set desired values for the pulse width $T_1$ of the first pulse signal, the repetition frequency of the second pulse signal, and the duty ratio.

In the second and third specific examples described above (see FIGS. 13 and 16), a switch control section 16, the pulse width adjusting circuit 170, the repetition frequency adjusting circuit 172 and the duty ratio adjusting circuit 174, can be arranged as a custom type IC in the solenoid-operated valve-driving circuit 10.

In the solenoid-operated valves 12A to 12C according to the first to third embodiments described above, the solenoid-operated valve-driving circuit 10 may also be electrically connected via a cable to a solenoid coil of a commercially available solenoid-operated valve, or the solenoid-operated valve-driving circuit 10 is provided as a unit, which is externally attached to a commercially available solenoid-operated valve. Also, the solenoid-operated valve-driving circuit 10 as a unit, as describe above, may be externally attached to a commercially available manifold for a solenoid-operated valve.

In each of the solenoid-operated valves 12A to 12C according to the first to third embodiments described above, each of the transistors 28, 86 is a PNP-type transistor, and the MOSFET 110 is an enhanced type P-channel MOSFET. However, it is also possible to adopt an arrangement in which each of the transistors 28, 86 is an NPN-type transistor, and the MOSFET 110 is an enhanced type N-channel MOSFET. In this arrangement, it is necessary to modify elements of the solenoid-operated valve-driving circuit 10, so that a pulse signal having a positive polarity can be supplied to the base terminals 30*c*, 98*c* of the transistors 28, 86 and to the gate terminal 112*c* of the MOSFET 110.

In each of the solenoid-operated valves 12A to 12C according to the first to third embodiments, the diode 26 is electrically connected between the switch 24 and the switch section 18, in order to protect the circuit (protect against reverse connection). In place of the diode 26, a nonpolar diode bridge may be electrically connected.

The solenoid-operated valve and the solenoid-operated valve-driving circuit according to the present invention is not limited to the embodiments described above, but may be embodied in various other forms without deviating from the gist and essential characteristics of the present invention.

What is claimed is:

1. A solenoid-operated valve, which is driven by applying a first voltage to a solenoid coil and which is maintained in a driven state by applying a second voltage, said solenoid-operated valve comprising:

a solenoid-operated valve-driving circuit electrically connected respectively to a power source and to said solenoid coil, said solenoid-operated valve-driving circuit including a switch control section and a switch section, wherein said switch control section generates a control signal composed of first and second pulse signals, the generated control signal being supplied to said switch section; and said switch section applies a power source voltage of said power source, as said first voltage, to said solenoid coil during a period of time in which said first pulse signal is supplied, while said switch section applies said power source voltage, as said second voltage, to said solenoid coil during a period of time in which said second pulse signal is supplied, wherein said switch section comprises a semiconductor element comprising one of a transistor and a MOSFET, said semiconductor element having a first terminal electrically connected to said power source, a second terminal electrically connected to said solenoid coil, and a third terminal electrically connected to said switch control section, wherein said switch control section further includes a single pulse-generating circuit that generates, as said first pulse signal, a single pulse signal having a predetermined pulse width on the basis of said power source voltage, said single pulse signal being generated and supplied to said switch section simultaneously with said second pulse signal, wherein said switch control section is capable of adjusting an intermittent discontinuity time of said solenoid-operated valve-driving circuit, and wherein said single pulse-generating circuit comprises a timer counter circuit, which stops generation of said single pulse signal while maintaining generation of said second pulse signal when a predetermined period of time elapses from supply of said power source voltage.

2. The solenoid-operated valve according to claim 1, wherein said switch control section further includes a repetitive pulse-generating circuit, which repeatedly generates said second pulse signal, said second pulse signal having a pulse width narrower than that of said first pulse signal.

3. The solenoid-operated valve according to claim 2, wherein said repetitive pulse-generating circuit is capable of adjusting a repetition frequency of said second pulse signal and a duty ratio of said second pulse signal.

4. The solenoid-operated valve according to claim 1, wherein said single pulse-generating circuit is capable of adjusting said pulse width of said first pulse signal.

5. The solenoid-operated valve according to claim 1, wherein said switch control section is capable of suppressing fluctuations of said power source voltage which is supplied to said switch control section.

6. A solenoid-operated valve-driving circuit, which drives a solenoid-operated valve by applying a first voltage to a solenoid coil of said solenoid-operated valve and which maintains said solenoid-operated valve in a driven state by applying a second voltage, said solenoid-operated valve-driving circuit comprising:

a switch control section; and a switch section, said solenoid-operated valve-driving circuit being electrically connected respectively to a power source and to said solenoid coil, wherein said switch control section generates a control signal composed of first and second pulse signals, the generated control signal being supplied to said switch section;

said switch section applies a power source voltage of said power source, as said first voltage, to said solenoid coil during a period of time in which said first pulse signal is supplied, while said switch section applies said power source voltage, as said second voltage, to said solenoid coil during a period of time in which said second pulse signal is supplied, wherein said switch section comprises a semiconductor element comprising one of a transistor and a MOSFET, said semiconductor element having a first terminal electrically connected to said power source, a second terminal electrically connected to said solenoid coil, and a third terminal electrically connected to said switch control section, wherein said switch control section further includes a single pulse-generating circuit that generates, as said first pulse signal, a single pulse signal having a predetermined pulse width on the basis of said power source voltage, said single pulse signal being generated and supplied to said switch section simultaneously with said second pulse signal, wherein said switch control section is capable of adjusting an intermittent discontinuity time of said solenoid-operated valve-driving circuit, and wherein said single pulse-generating circuit comprises a timer counter circuit, which stops generation of said single pulse signal while maintaining generation of said second pulse signal when a predetermined period of time elapses from supply of said power source voltage.

7. The solenoid-operated valve-driving circuit according to claim 6, wherein said switch control section further includes a repetitive pulse-generating circuit, which repeatedly generates said second pulse signal, said second pulse signal having a pulse width narrower than that of said first pulse signal.

8. A solenoid-operated valve according to claim 1, further comprising a voltage-generating section, said power source voltage being supplied to said voltage-generating section for initiating operation of said voltage-generating section, wherein said voltage-generating section generates a voltage having a voltage value larger in amplitude than that of said power source voltage supplied thereto from said power source, the generated voltage being supplied to said switch section, and wherein said switch section applies said voltage having the larger voltage value, as said first voltage, to said solenoid coil during a period of time in which said first pulse signal is supplied, while said switch section applies a voltage having a voltage value substantially equal to that of said first voltage, as said second voltage, to said solenoid coil during a period of time in which said second pulse signal is supplied.

9. A solenoid-operated valve-driving circuit according to claim 6, further comprising a voltage-generating section, said power source voltage being supplied to said voltage-generating section for initiating operation of said voltage-generating section, wherein said voltage-generating section generates a voltage having a voltage value larger in amplitude than that of said power source voltage supplied thereto from said power source, the generated voltage being supplied to said switch section, and wherein said switch section applies said voltage having the larger voltage value, as said first voltage, to said solenoid coil during a period of time in which said first pulse signal is supplied, while said switch section applies a voltage having a voltage value substantially equal to that of said first voltage, as said second voltage, to said solenoid coil during a period of time in which said second pulse signal is supplied.

* * * * *